United States Patent [19]
Endo et al.

[11] Patent Number: 5,754,304
[45] Date of Patent: May 19, 1998

[54] IMAGE FORMING SYSTEM

[75] Inventors: Hiroshi Endo, Sagamihara; Kazuyoshi Takahashi, Kashiwazaki; Toshiyuki Yanaka, Tokyo, all of Japan

[73] Assignee: Canon Kabushiki Kaisha, Tokyo, Japan

[21] Appl. No.: 892,881

[22] Filed: Jul. 15, 1997

Related U.S. Application Data

[63] Continuation of Ser. No. 312,923, Sep. 30, 1994, abandoned.

[30] Foreign Application Priority Data

Oct. 1, 1993 [JP] Japan ................................ 5-247230

[51] Int. Cl.[6] .............................................. H04N 1/46
[52] U.S. Cl. .......................... 358/298; 358/528; 399/196; 382/298
[58] Field of Search ............................. 358/296, 298, 358/528; 347/5; 399/196; 382/47, 28; 395/102

[56] References Cited

U.S. PATENT DOCUMENTS

| | | | |
|---|---|---|---|
| 4,711,558 | 12/1987 | Tanioka et al. | 355/14 R |
| 4,920,502 | 4/1990 | Yamada | 364/518 |
| 5,065,198 | 11/1991 | Yamashita et al. | 355/313 |
| 5,083,216 | 1/1992 | Abuyama | 358/451 |
| 5,168,369 | 12/1992 | Sugiura | 358/296 |
| 5,465,163 | 11/1995 | Yoshihara et al. | 358/444 |
| 5,553,201 | 9/1996 | Muramatsu | 395/109 |

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

When an magnified and synthesized image is finally printed on a printing medium based on an original image and a character font data, linear magnifying processing is executed with the aid of a software on the host computer side for the original image optically read by a scanner. In addition, vector magnifying processing is executed for font data likewise with the aid of a software, and moreover, synthesizing processing is executed for the font data. At this time, forming processing such as edge emphasizing or the like can be executed after completion of the vector magnifying processing. Synthesizing data are additionally magnified in a printer with the aid of a hardware, and subsequently, the magnified and synthesized image is outputted to the printer for performing a printing operation by the latter. An magnifying rate applicable to the host computer and the printer can be determined such that productivity of the image forming system is maximized.

34 Claims, 21 Drawing Sheets

FIG.5

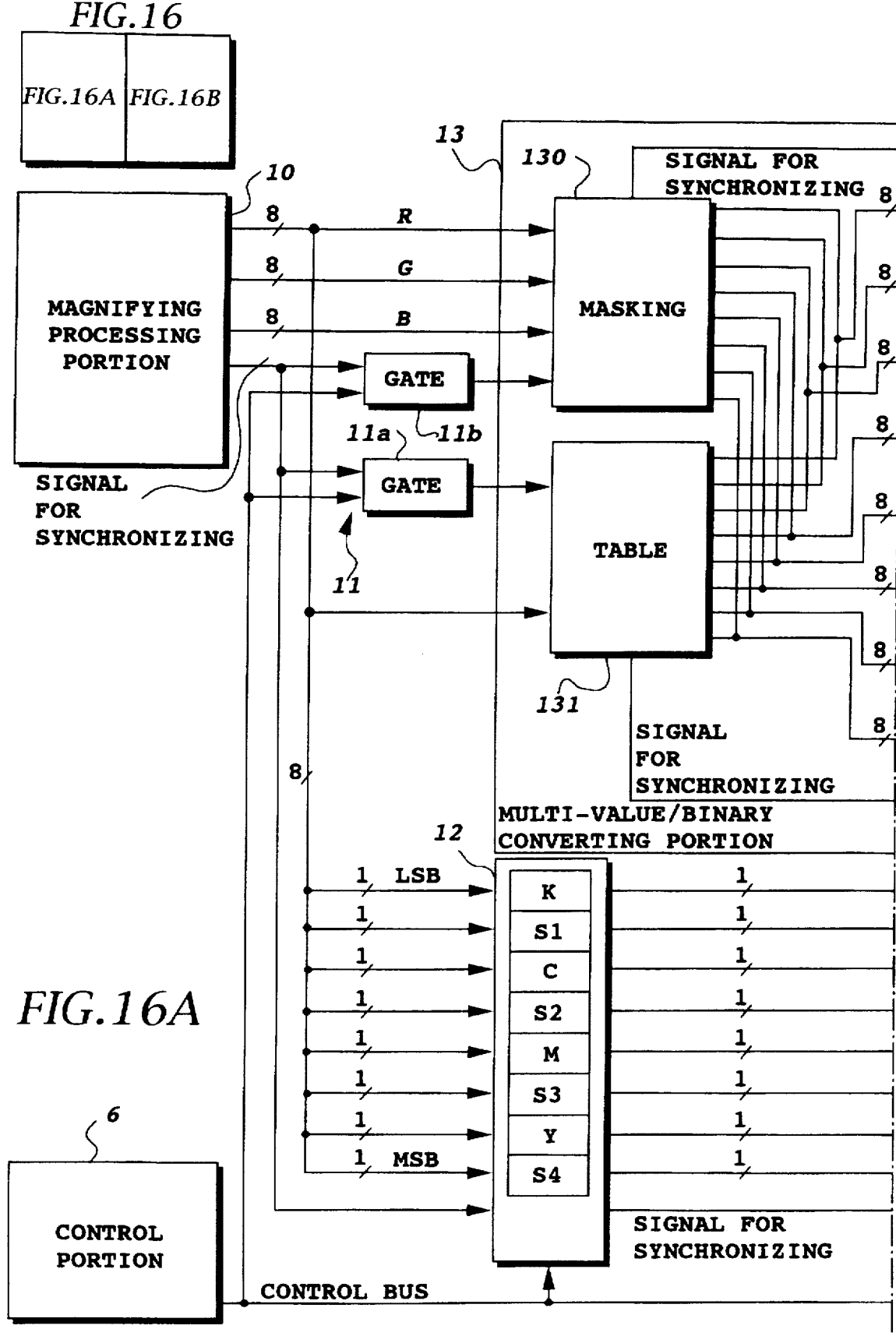

IMAGE FORMING SYSTEM

This application is a continuation, of application Ser. No. 08/312,923 filed Sep. 30, 1994 now abandoned.

BACKGROUND OF THE INVENTION

1. Field of the Invention

The present invention relates generally to an image forming system. More particularly, the present invention relates to an image forming system for printing an magnified image such as a large-sized image or the like on a printing medium using a printing apparatus other than a conventional silver halide type printing apparatus. There is not only a common paper used generally but also an OHP sheet, cloth and so forth as a printing medium which can be used in the image forming system. The printing apparatus is adapted to perform printing to such printing medium adequately. In the description in the present specification, a term "magnify" means to make something appear larger as well as to cause something to grow larger.

2. Description of the Prior Art

When an magnified image is printed on a printing medium using a printing apparatus such as a copying machine, a printer or the like, each printing operation is hitherto performed by using the analogue data obtained by magnifying an original image via optical processings to be executed by actuating a zoom lens or the like as they are. Otherwise, each printing operation is hitherto performed by optically reading an original image with the aid of a scanner or the like to transform it into digitized image data, allowing the digitized image data to be subjected to total magnifying processing, and subsequently, using the data obtained from the foregoing total magnifying processing.

Among the conventional printing methods, the printing method of obtaining analogue data by optically magnifying an original image by actuating a zoom lens or the like has a problem that when the original image is magnified in excess of a certain magnification, a quality of magnified image is degraded depending on a resolution of the original image. For this reason, an magnifying rate applicable to the printing method is restrictively determined corresponding to a desired quality of image. To assure that the magnifying rate is not restrictively determined while maintaining a quality of image in excess of a predetermined level, it is necessary that the analogue data are subjected to magnifying processing with the aid of digital processing means. In this case, the number of processing steps to be executed with the whole image forming system is unavoidably increased.

On the other hand, with respect to the printing method wherein image data obtained by optically reading an original image are subjected to magnifying processing, in the case that the kind of image data is a single kind of image data, e.g., a nature image, there does not arise any particular problem with the foregoing conventional method. However, for example, in the case that the image data are prepared by combining a nature image with a plurality of characters, when they are subjected to uniform magnifying processing, there sometimes arises an occasion that one of the image qualities is degraded due to the nature of the thus combined image.

For example, in the case that magnifying processing is executed by linear interpolation, since the content of pixel data to be interpolated is linearly determined in proportion to a data distance between respective pixels defining the original image, there is recognized a tendency that an intermediate color between the colors of respective pixels appears on the original image. The foregoing magnifying processing exhibits such a nature that gradation as often seen with a nature image is reserved after completion of the magnifying processing. However, with respect to a sharp image such as a character or the like having no gradation continuance in association with the relationship relative to its background, sharpness is lost along the boundary of the sharp image due to the linear interpolation between the sharp image and the background image, causing the focused state of the sharp image to be hardly recognized. Thus, there sometimes arises an occasion that a quality of character image is undesirably degraded. On the contrary, when a sharp image such as a character or the like is kept valid after completion of the magnifying processing, uniform gradation variation is not recognized in the region where the gradation of the image should gradually vary. This leads to a comparatively significant problem when an image is composed of many combinations made between a nature image and a plurality of characters as seen with a poster or the like.

To solve the aforementioned problems, a proposal has been made with respect to a method of improving a quality of character image by executing edge emphasizing processing or the like after completion of the magnifying processing. However, the thus proposed method has still a problem that many processing steps and an increased memory capacity are required. Especially, in the case that the magnifying processing is executed for a very large-sized image with the aid of a software, since the number of image data is increased in proportion to a square of magnification, the foregoing increase of the memory capacity becomes a large magnitude of load to be borne by the image forming system.

In addition, the foregoing increasing of the memory capacity becomes a significant problem from the viewpoint of the structure of the image forming system. Specifically, many requests have been raised from users for driving a printing unit at a high speed for the purpose of operating the image forming system at a high efficiency. To practically satisfy these requests, it is desirable that each memory employed for the image forming system is prepared in the form of a semiconductor memory capable of operating at a high speed. In this case, when an output from the printing unit is a very large-sized image such as a poster or the like, a plurality of semiconductor memories each having a large capacity are required, resulting in a cost of the image forming system being largely increased.

In addition, in the case that the aforementioned requests are practically satisfied with the aid of hardware means, when a printing speed is taken into significant consideration, magnifying processing can simply be executed. However, the kind of processing capable of being executed at this time is limited only to the kind of processing, e.g., simple repetition of pixel data. For this reason, it is unavoidable that a resolution of the image forming system is degraded. In view of the foregoing fact, if sufficient processings are intentionally executed, the structure of a hardware installed in a data processing system becomes very complicated. This leads to the result that it is unavoidable that a cost of the image forming system is increased, a printing speed of the printing unit is reduced, and productivity of the image forming system is degraded.

As is apparent from the above description, in the case that an image composed of a combination made between a nature image and a plurality of characters is magnified and printed on a printing medium by practicing the conventional image forming method, each of an optical method, a method to be practiced with the aid of a software and a method to be practiced with the aid of a hardware has a problem specific thereto. For this reason, it is practically difficult to realize an image forming method which assures that a sufficient function can be exhibited with a reduced cost.

SUMMARY OF THE INVENTION

The present invention has been made in consideration of the aforementioned background.

An object of the present invention is to provide an image forming system which assures that printing functions such as a resolution, gradation properties or the like can satisfactorily be exhibited when a combined image is magnified and printed on a printing medium and which makes it possible to maximize productivity of the whole image forming system while reducing a cost of the latter.

The detailed structure of the image forming system constructed in accordance with the present invention will be described below.

Specifically, in the case that image magnifying is achieved by processings to be executed with the aid of a hardware, a memory capacity of the image forming system can be reduced, and moreover, a cost of the image forming system can likewise be reduced. In this case, it is considered that a method of executing processing for magnifying of a hardware via simple repetition is reasonably acceptable from the viewpoint of a cost and a processing speed but it is anticipated that there arises a problem that a resolution of the image forming system is reduced with the result that ruggedness appears around each character on a printed image, and moreover, particles on a nature image are coarsely distributed on the same. For this reason, in the case that processings are executed with the aid of a hardware, although a memory capacity can be reduced with an magnified image such as a large-sized image or the like, an magnifying rate of the magnified image is restrictively determined depending on a resolution thereof.

According to the present invention, the image forming system is constructed in such a manner as to include means for executing processings with aid of a software and means for executing processings with aid of a hardware in order to enable each magnifying processing to be executed without any deterioration of a quality of image while excellently matching with the nature of a synthesized image wherein a part of shortage in magnification with the hardware is compensated by magnification with the software, and moreover, sufficient combination is made among various kinds of image sizes.

Factors associated with the determination of an magnifying rate are typically noted below.

1. resolution required by an image to be outputted.
2. capacity of a semiconductor memory installed in a printing section.
3. loads to be borne by a host computer for executing magnifying processings (processing speed and capacity of a memory installed in the host computer when edge emphasizing processing or the like is executed)

In addition, in consideration of trading-off of these factors, the image forming system is constructed such that productivity of the whole image forming system in respect of outputting for each printing operation (i.e., quantity of production per unit time and production cost) can be maximized by determining values representing the foregoing factors.

Furthermore, in an embodiment of the present invention as will be described later, the magnifying rate is distributively used in the following manner.

To determine a ratio of magnification with the hardware to magnification with the software in association with the total magnifying rate, the productivity of the whole image forming system is taken into consideration, and moreover, a quality of results derived from each printing operation is taken into significant consideration. In other words, the magnifying rate is distributively used to improve the productivity of the whole image forming system within the range where a quality of image is assured. In addition to the aforementioned factors associated with the determination of the magnifying rate, a nature of image (nature image having much gradation, sharp image inclusive of computer graphic and character) and a resolution of a printing section disposed in the image forming system are closely related to the foregoing distributive usage of the magnifying rate.

For example, in the case that an original image having a sufficient resolution is magnified or only a nature image is magnified, magnifying processings are executed by magnifying the software as far as a memory capacity of the printing section in the image forming system is allowed. When data can not be stored in a memory installed in the printing section, magnifying processings are increasingly executed with aid of the hardware in accordance with the order represented by one multiple, two multiples, . . . , until a quantity of data lies within the range of an allowable memory capacity. Thus, the remaining part of data incapable of being stored in the memory is processed with aid of the software.

When the memory capacity has comparatively large allowance, it is acceptable that magnifying processings are executed by the software as far as possible in the above-described manner. For example, in the case that a printing resolution described on an image format shows a comparatively high value of 400 dpi, when the hardware is magnified by a quantity of four multiples to eight multiples with the aid of the hardware, a quality of image is not significantly degraded without any particular visual problem. At this time, it is recommendable that the hardware is magnified as far as possible and the remaining part of magnifying processing is executed by the software. This assures that a rate of executing processings with aid of the software can be reduced, resulting in productivity of the image forming system being improved.

In the case that an original image includes a sharp image such as a character or the like having a sufficient resolution, a resolution of the printing section becomes significant. For example, in the case that the original image has a resolution of 400 dpi, when a rate of magnifying with the hardware is set to four multiples, a number of serrations each having a depth of 0.245 mm are visually recognized along the outer periphery of each character but these serrations lie in the vicinity of the limitative range where they can not visually be recognized. For this reason, the foregoing depth of each serration can be utilized as a standard of upper limit of magnification rate which is achieved by the software. It of course is obvious that this is applicable when it is assumed that the memory capacity has a sufficient allowance. In the case that the printing section has a low resolution, it is naturally necessary that a rate of magnifying with the hardware is set to a value lower than four multiples.

When the original image does not have a sufficient resolution, the influence caused by magnifying the hardware leads to the result that a quality of image is degraded. For this reason, it is desirable that magnification of the hardware is not executed. In this connection, it is necessary that the number of memories is increased if possible.

Another object of the present invention is to provide an image forming system which assures that an advantage obtainable from magnifying processing to be executed with the aid of a software and magnifying processing to be executed with the aid of a hardware is maximized but a disadvantage attributable to the foregoing magnifying processings is suppressed wherein image magnification to be executed with the aid of the software and image magnification to be executed with the aid of the hardware are combined with each other, causing the image magnification to be attained by outputting for each printing operation.

In the first aspect of the present invention, an image forming system including an image processing section and a printing section to perform printing based on data magnified from image data, comprises;

first processing means for executing processings inclusive of image data magnifying processing with the aid of a software based on a first magnifying rate derived from an image format, second processing means for executing the image data magnifying processing with the aid of a hardware based on a second magnifying rate derived from the image format, and printing operation controlling means for allowing the printing section to execute printing operation based on the image data which have been subjected to magnifying processing with the aid of the first magnifying processing means and the second magnifying processing means.

In the second aspect of the present invention, an image forming system including an image processing section and a printing section to perform printing based on the synthesized and magnified data associated with plural kinds of image data, comprises;

processing means for executing processings inclusive of magnifying processing with respect to each of the plural kinds of image data based on a first magnifying rate derived from a preset image format, synthesizing processing means for synthesizing the plural kinds of image data each magnified by the processing means, based on a synthesizing information derived from the preset image format, magnifying processing means for executing magnifying processing for the image data synthesized by the synthesizing processing means, based on a second magnifying rate derived from the preset image format, and printing operation controlling means for allowing in the printing section to execute printing operation based on the image data which have been subjected to magnifying processing with the aid of the magnifying processing means.

In the third aspect of the present invention, an ink jet printing apparatus for performing printing using an ink jet head by ejecting ink to a printing medium from the ink jet head, comprises;

processing means for executing magnifying processing with the aid of a hardware for image data having the magnifying processing executed therefore, the image data being fed from a host apparatus, and printing operation controlling means for allowing the printing operation to be performed by driving the ink jet head based on the image data which have been subjected to magnifying processing by the processing means.

In the fourth aspect of the present invention, an image forming method comprises the steps of;

dividing a magnifying rate applicable when an magnified image is printed on a printing medium based on image data, into a plurality of partial magnifying rates of which multiplication represents the magnifying rate, executing a plurality of processings at the partial magnifying rates by executing processings inclusive of at least magnifying processing with the aid of a hardware and a software, and executing outputting for each printing operation based on the image data obtained from the magnifying processing.

In the fifth aspect of the present invention, a printed product already subjected to printing, comprises;

a group of dots each having a same density, dots in the group being arranged with a predetermined pattern, and a pattern composed of a plurality of dots among the groups, a density of the group in the pattern establishing the linear relationship relative to a density of each of two groups located adjacent to the group on the opposite sides of the latter.

Other objects, feature and advantages of the present invention will become apparent from reading of the following description which has been made in conjunction with the accompanying drawings.

BRIEF DESCRIPTION OF THE DRAWINGS

FIG. 16A and FIG. 16B are illustrative views which schematically explain an operation to be performed for shifting image buses corresponding to the multi-value data and the binary data stored in the printer 2, respectively;

DESCRIPTION OF THE PREFERRED EMBODIMENT

The present invention will now be described in detail hereinafter with reference to the accompanying drawings which illustrate a preferred embodiment thereof.

Figure 1:
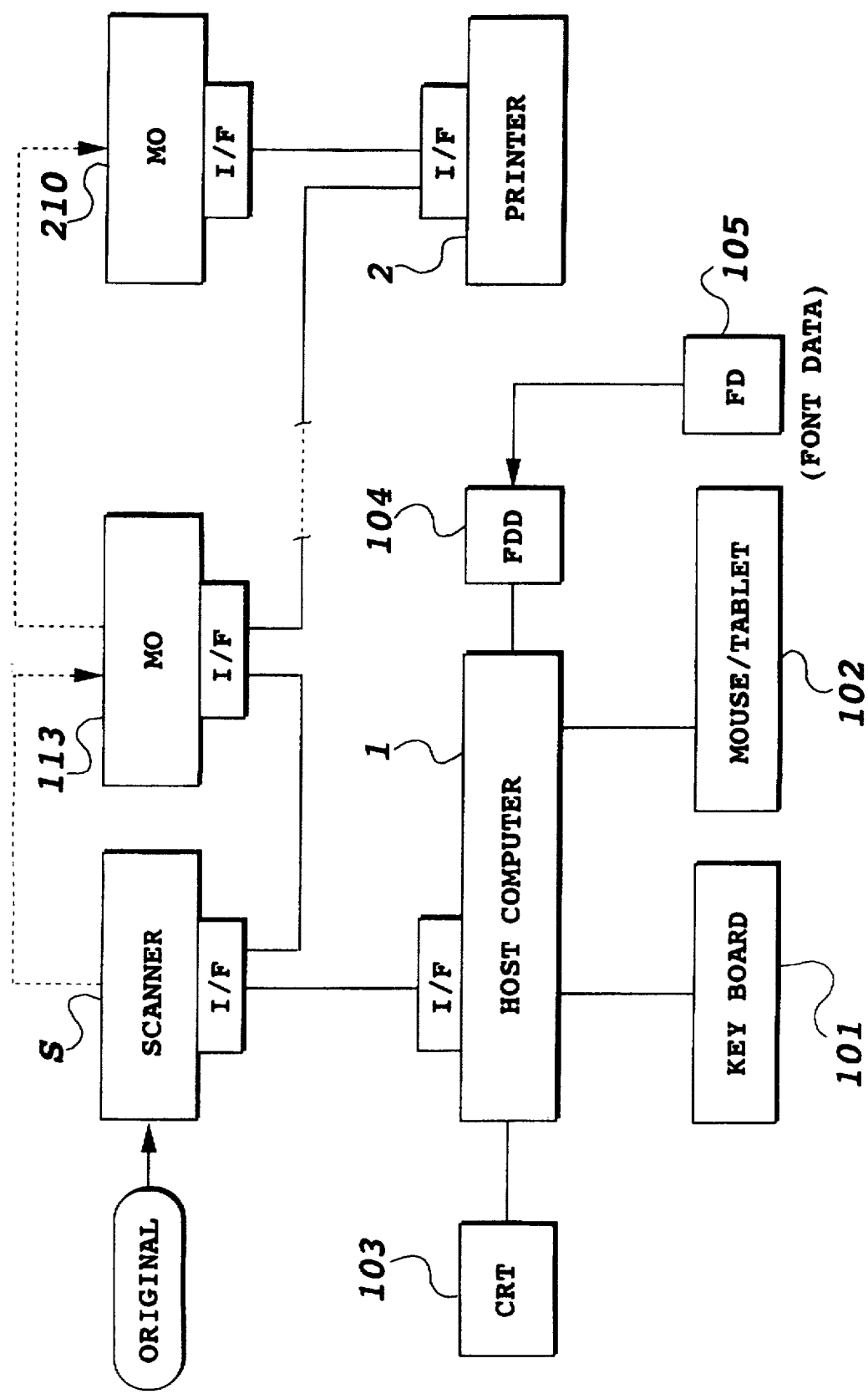
FIG. 1 is a block diagram which illustrates the fundamental structure of an image forming system constructed in accordance with an embodiment of the present invention.

FIG. 1 is a block diagram which illustratively shows the structure of an image forming system constructed in accordance with an embodiment of the present invention. Referring to FIG. 1, locations where magnifying processing or the like is executed are coincident with a host computer 1 and a printer 2.

Figure 2:
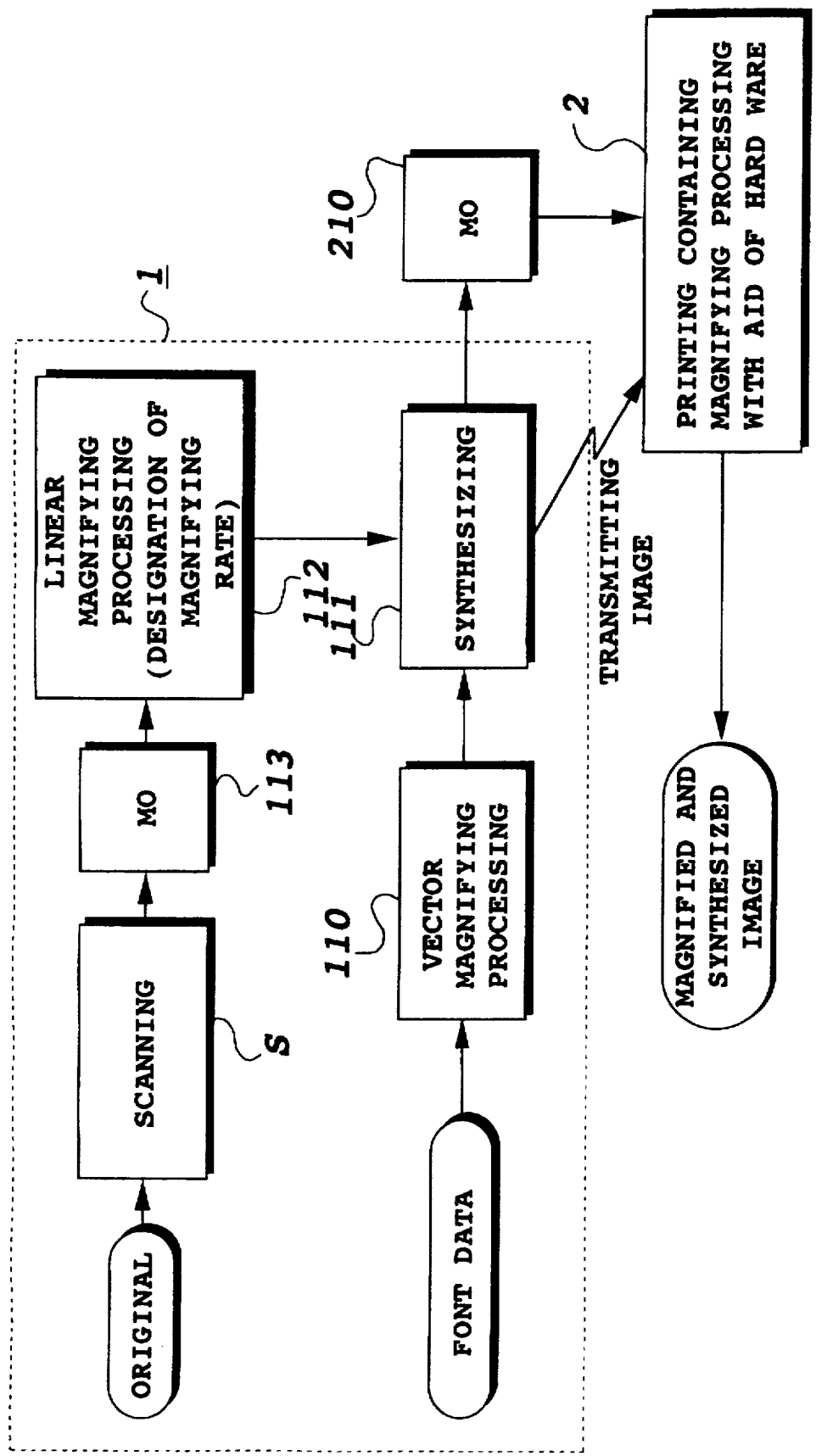
FIG. 2 is a block diagram which illustratively explains the flow of a series of image forming processings to be executed by employing the image forming system.
Figure 3:
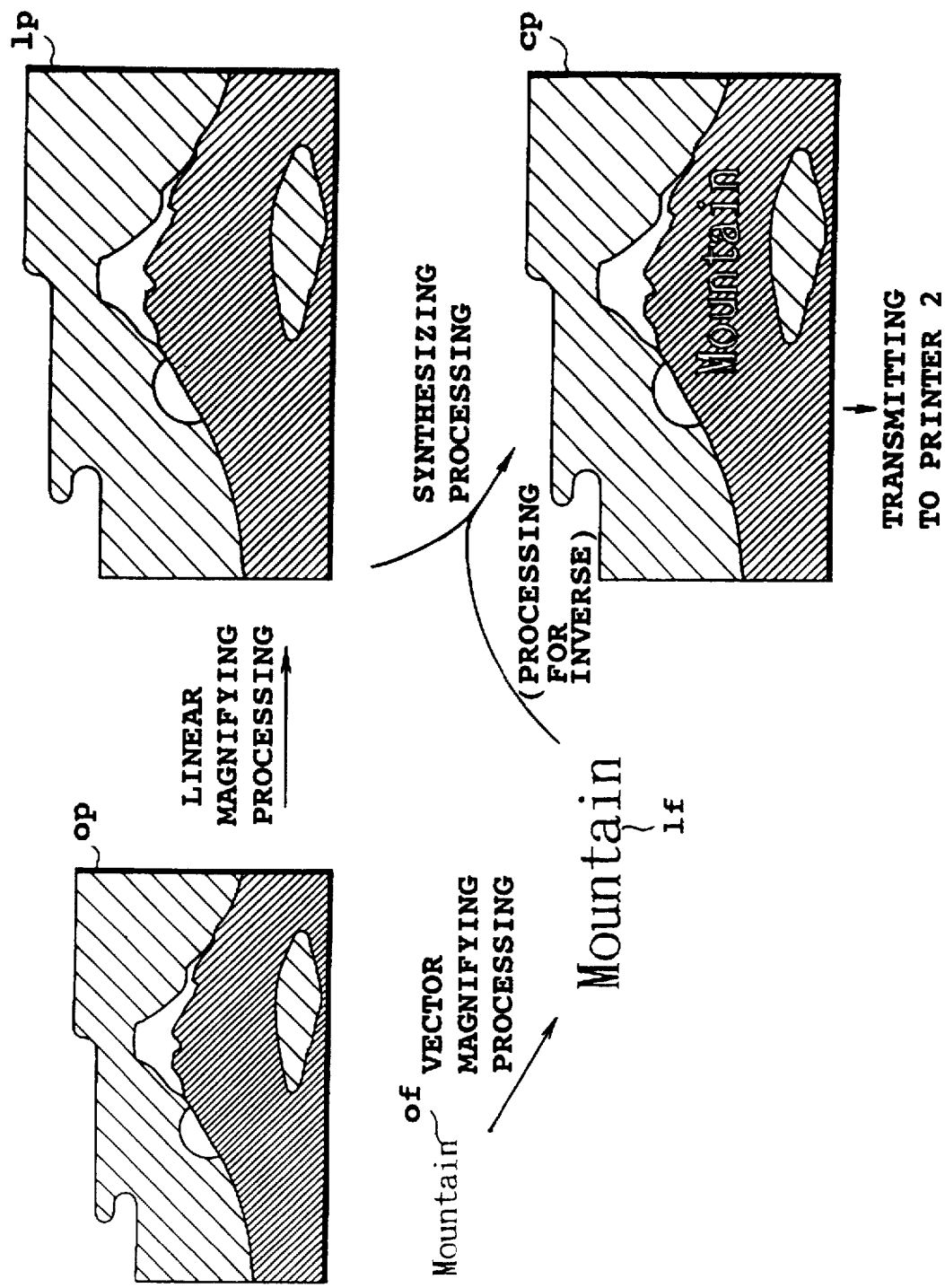
FIG. 3 is illustrative view which visually shows the flow of a series of image forming processings to be executed by employing the image forming system, respectively.

FIG. 2 is a block diagram which illustratively shows the flow of image processings to be executed by the host computer 1, and FIG. 3 is illustrative views which visually show the flow of image processings.

As is apparent from FIG. 1, various kinds of peripheral units or equipments are electrically connected to the host computer 1. More specifically, a key board 101 serving as data inputting means and a mouse/tablet 102 serving as data processing/handling means are electrically connected to the host computer 1, whereby preparation of a synthesized image and determination of an magnifying rate can be carried out via visual informations appearing on the screen of a cathoderay tube display 103. An original image is optically read by a scanner S, and subsequently, it is transmitted to the host computer 1 as digital data. In addition, the content of a floppy disc (FD) 105 having font data usable for a synthesized image or the like stored therein is electrically read by a floppy disc drive (FDD) 104.

FIG. 2 is a block diagram which illustratively shows the flow of processings of magnifying and synthesizing to be executed by the host computer 1 with the aid of a software.

Digital data representing an original image op (see FIG. 3) optically read by the scanner S are stored in the disc of a photomagnetic disc drive (MO) 113, and thereafter, the data of the original image op is linearly magnified by executing linear magnifying processing 112, resulting in processing data lp derived from the linear magnifying processing 112 being obtainable (see FIG. 3).

On the other hand, font data of (see FIG. 3) are transformed into magnified font data if (see FIG. 3) by executing vector magnifying processing 110.

The data lp and if obtained by executing the aforementioned magnifying processings are synthesized with each other by executing data synthesizing processing 111, resulting in synthesized data cp (see FIG. 3) being obtainable. The thus obtained synthesized data cp are stored in a magnetic disc drive 210 or transmitted directly to a printer 2.

Figure 19:
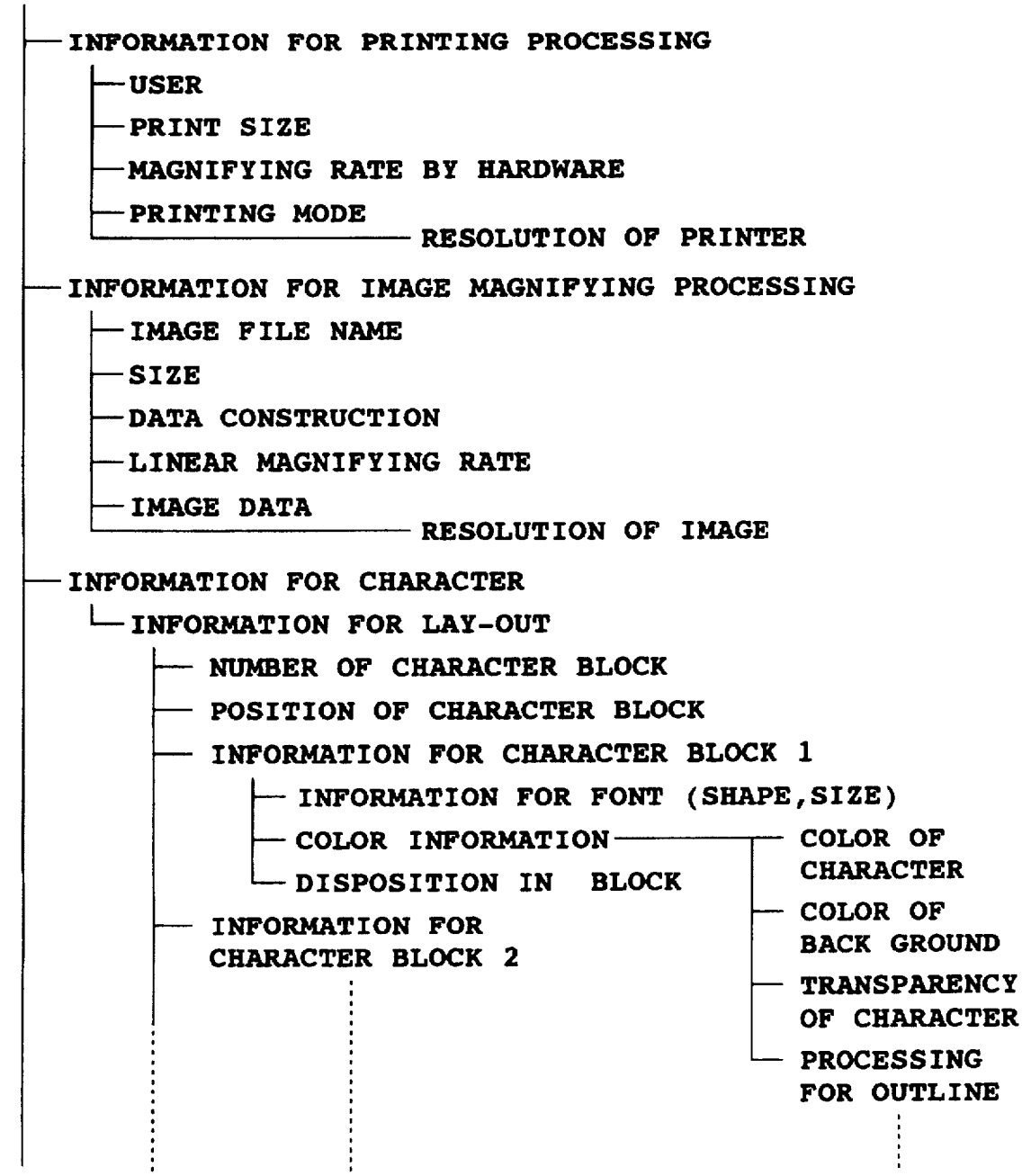
FIG. 19 is an illustrative view which schematically shows by way of example an image format to be employed for the image processing system.

With the image forming system constructed in the above-described manner, informations representing an magnifying rate, arrangement of synthesized images or the like are displayed in accordance with an image format shown in FIG. 19 so that processings of image magnifying and image synthesizing are executed based on the foregoing informations.

Figure 4:
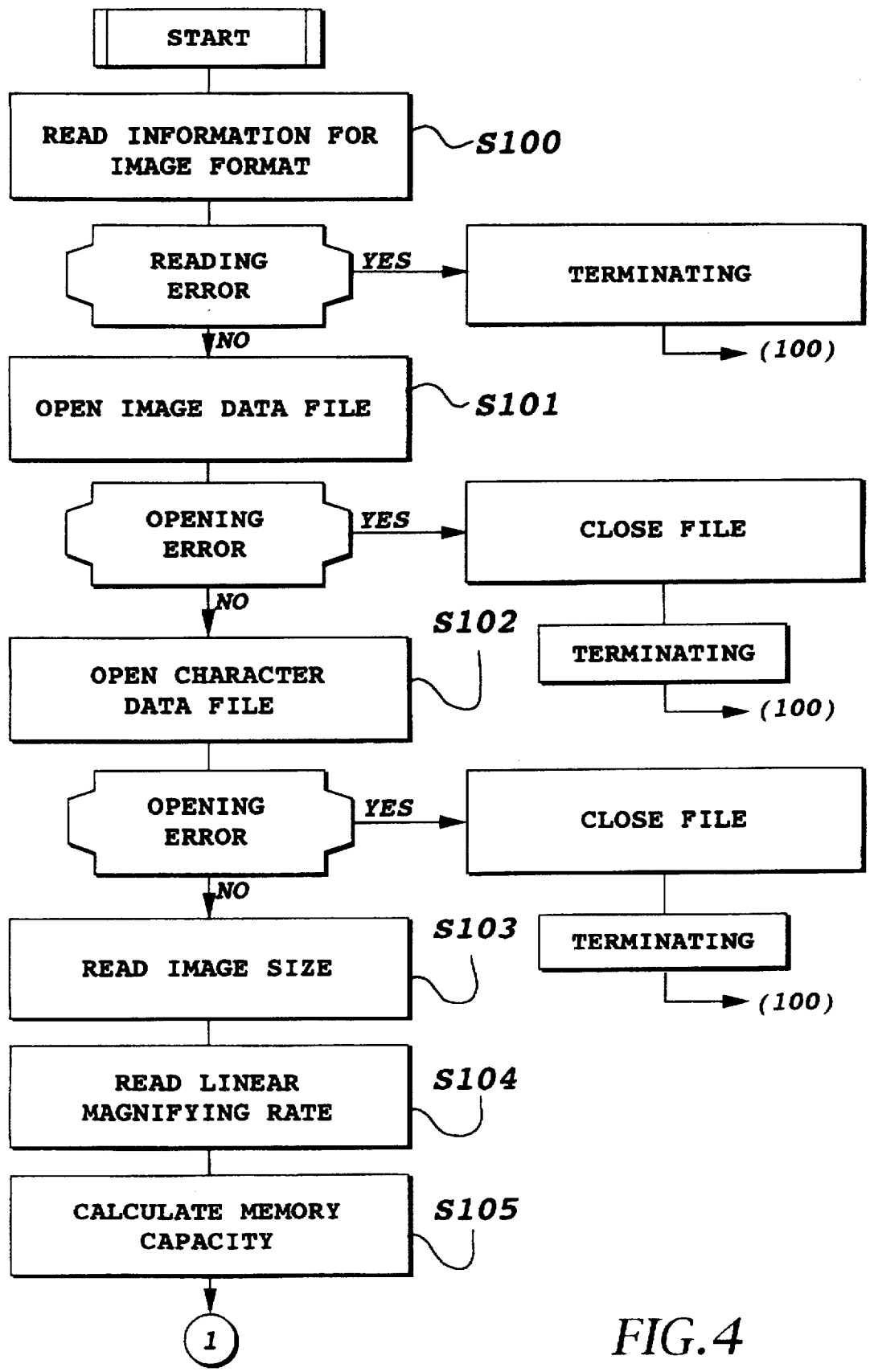
FIG. 4 is a flowchart which illustrates a procedure of executing processings for magnifying and synthesizing with the aid of a host computer for the image forming system.

Image magnifying processing represented by the foregoing linear magnifying processing 112 will be described in detail below with reference to flowcharts shown in FIG. 4 to FIG. 6.

The program starts from a step S100 in which image format informations (see FIG. 19) representing an image to be first printed are read. Subsequently, an image data file and a character data file are opened based on the image format informations (step S101, step S102), causing a size of image data and a linear magnifying rate to be read (step S104 and step S105). In addition, a memory capacity available after completion of the image magnifying processing is calculated with reference to the data size and the linear magnifying rate (step S105), and subsequently, it is confirmed that the available memory capacity does not exceed the capacity of a memory installed in the printer 2 (step S106).

Next, character informations covering all character data are successively read (step S107), and subsequently, an overlap range applicable at the time of a synthesizing operation is determined based on a font type, font size and a synthesizing reference position shown on the image format (step S108), whereby it is confirmed that the overlap range lies within the image data range confirmed in the above-described manner (step S109). After it is confirmed that each image can be enlarged and synthesized without any problem, magnifying processing is first executed based on the image data with the aid of a software (step S110).

Figure 7:
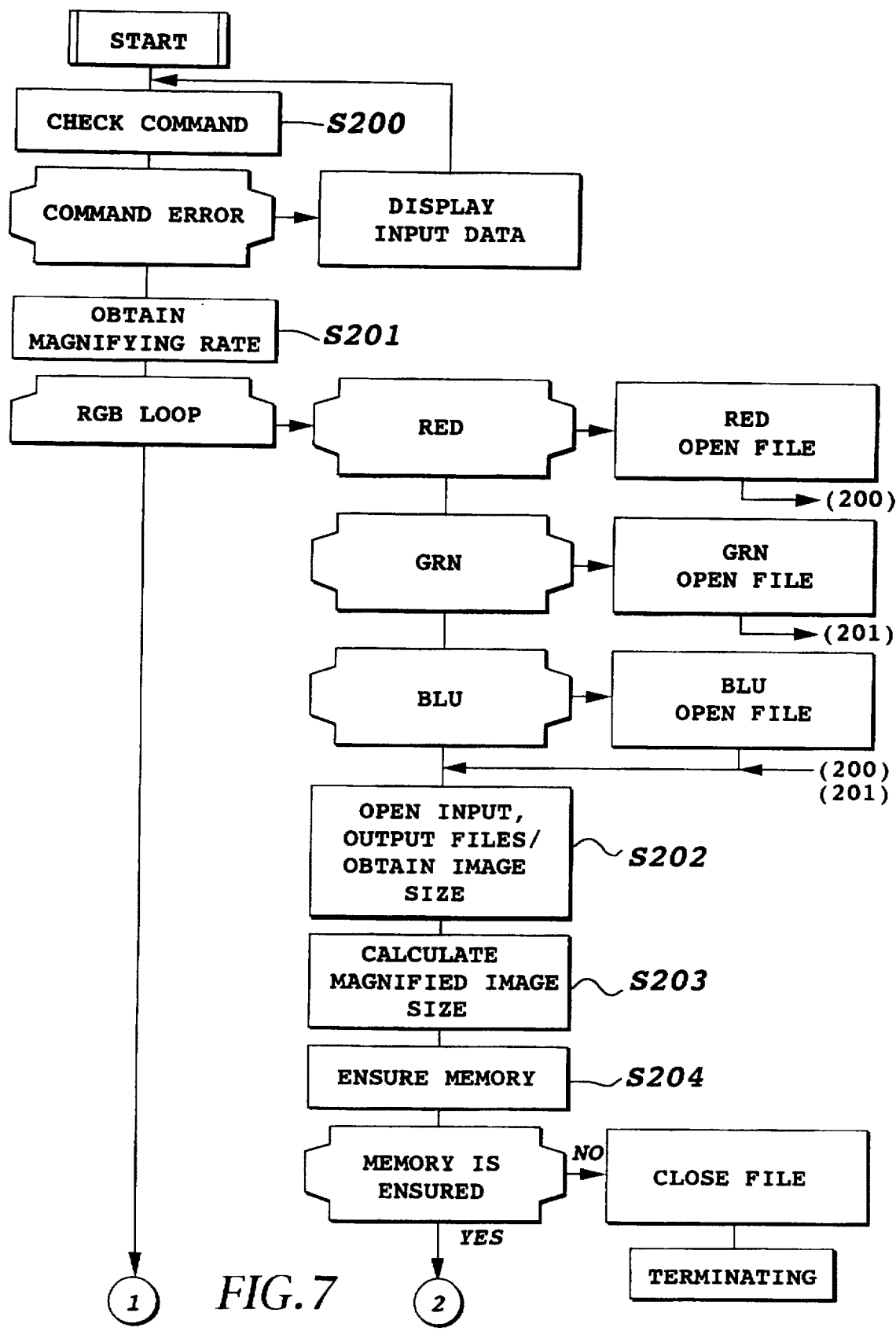
FIG. 7 is a flowchart which illustrates processings for linear magnifying in detail in association with the foregoing processing for magnifying.
Figure 8:
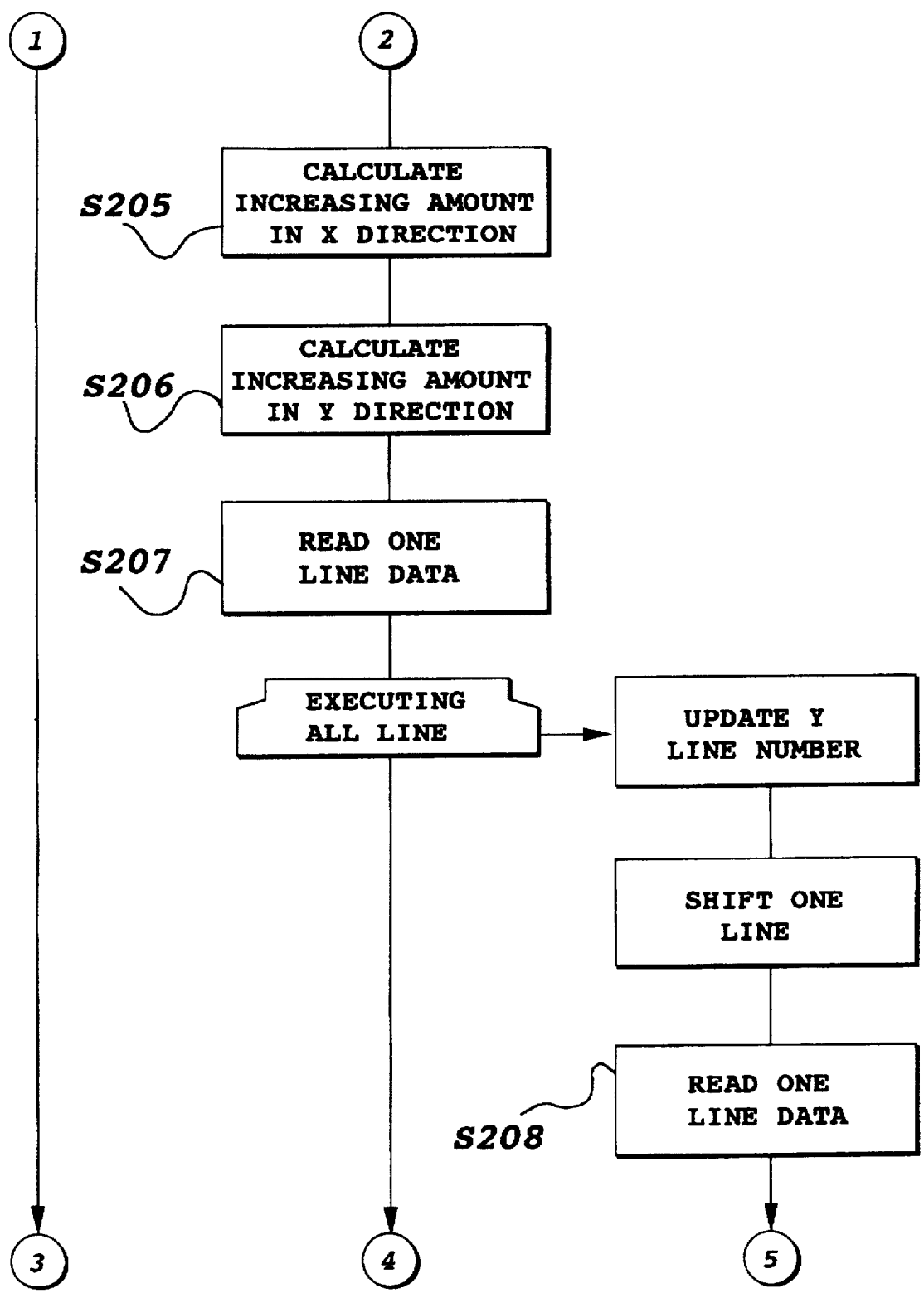
FIG. 8 is another flowchart which illustrates processings for linear magnifying in detail in association with the foregoing processing for magnifying.
Figure 9:
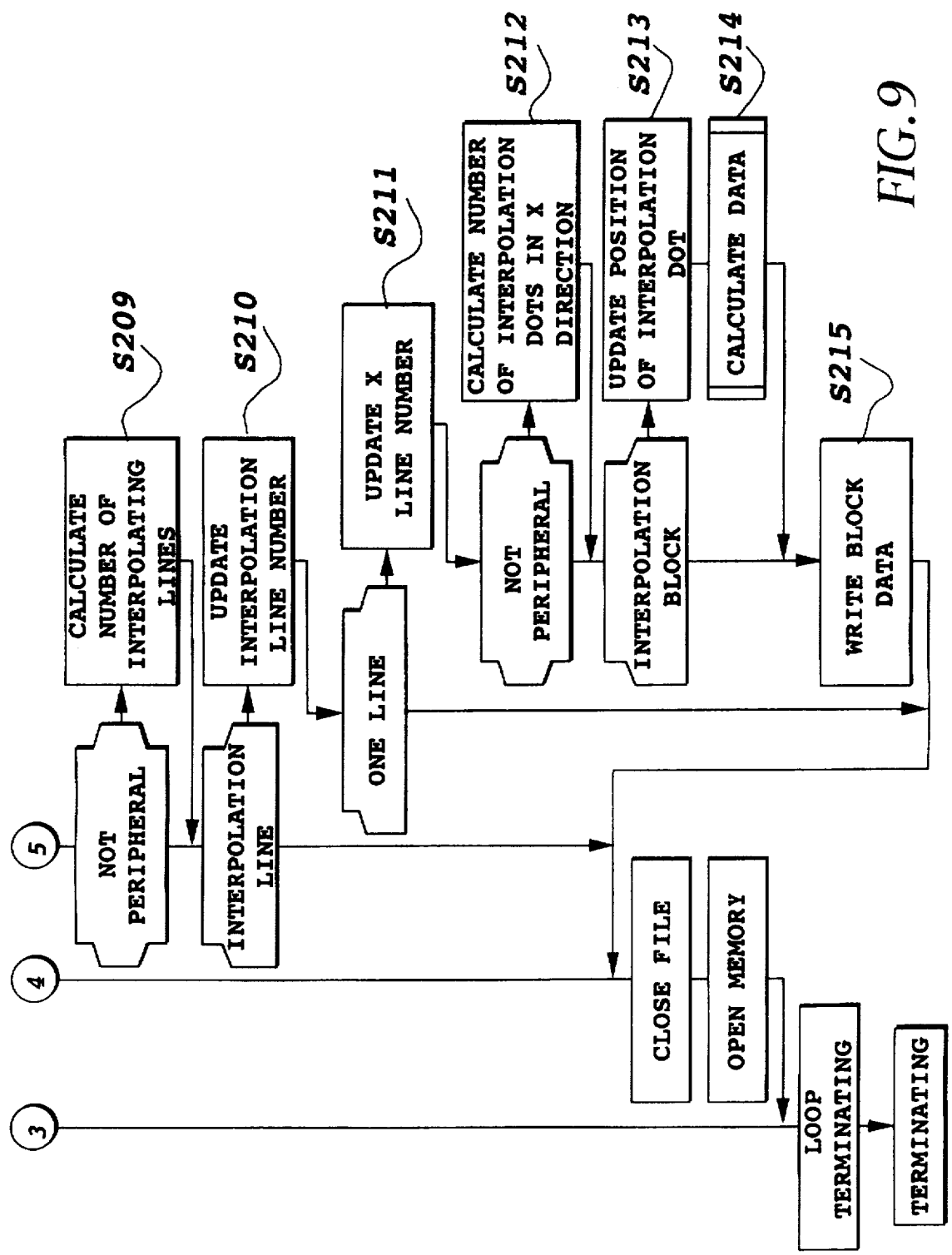
FIG. 9 is further flowchart which illustrates processings for linear magnifying in detail in association with the foregoing processing for magnifying.

With respect to magnifying methods to be practiced with the aid of a software, one of them, i.e., a linear magnifying method will herein be exemplified with reference flowcharts shown in FIG. 7 to FIG. 9.

After a command for magnifying processing is detected (step S200), an magnifying rate is read (step S201), and thereafter, magnifying processing is started.

First, an image data file is opened to obtain an image size (step S202), and subsequently, an magnified image size is determined based on the image size and the magnifying rate (step S203), whereby a processing work memory can be held in the activated state (step S204).

A fundamental method of linear magnifying processing consists in inserting an interpolated pixel in such a manner as to maintain smooth gradation continuance between adjacent pixels constituting an image. To practice this method, two-dimensional arrangement, i.e., four pixels composed of upper and lower adjacent pixels located at four corners is taken into account. Here, a magnitude of arrangement, i.e., an magnifying rate is determined by determining the total number of interpolated pixels with reference to a preset magnifying rate and then possibly uniformly distributing the respective interpolated pixels between adjacent original pixels although it varies depending on the number of interpolated pixels to be inserted not only in the vertical direction but also in the transverse direction. In view of the foregoing fact, the number of inserted pixels is not kept constant but it varied depending on the position where rows of interpolated pixels are read. For this reason, the number of inserted pixels is determined in the vertical direction, and moreover, it is determined in the transverse direction (step S205, step S206). Next, image data corresponding to a single transverse row of pixels are first read as interpolation processing (step S207), and subsequently, data corresponding to a single row are read every time each row is updated (step S208). In such manner, data corresponding to two rows are maintained, data corresponding to four pixels in total composed of two upper and lower pixels are taken out, the number of lines as seen in the vertical direction and the number of rows as seen in the transverse direction are calculated at the position where the data are taken in that way (step S209 and S212), a size of the two dimensional arrangement is determined, and thereafter, the respective rows of magnified images inclusive of interpolated rows are updated (step S210). In addition, the position where four pixels present in each updated row are taken out with respect to the pixels representing the original image are updated (step S211), the position where pixels inclusive of interpolated pixels are located is updated (step S213), and subsequently, respective interpolated data representing the pixel position are obtained in accordance with a calculation formula (step S214).

Data representing four pixels located at the four corners of an image can be used for conducting the foregoing calculation as they are. However, interpolated pixels other than the aforementioned ones are obtained from the data representing four pixels by conducting an interpolating calculation. This interpolating method is practiced such that calculation is conducted in such a manner as to substantially uniformalize a difference between data representing adjacent pixels among two-dimensionally arranged pixels. Results derived from the foregoing calculation are obtained with proportional weighing added thereto. When it is assumed that data representing the pixels located at the four corners are represented by a (k, l), a (k+1, l), a (k+1, l) and a (k+1, l+1) and a size of two-dimensionally arranged pixels is represented by (x+1)*(y+1), interpolated data representing the two-dimensional pixels are obtained in accordance with the following equation.

$$h(m, n) = n\{(m * a(k + 1, l + 1) + (x - m) *$$
$$a(k, l + 1)\} + (y - n) \times \{(m * a(k + 1, l) +$$
$$(x - m) * a(k, l)\}/x * y$$

where $0 \leq m \leq x$, $0 \leq n \leq y$

Next, the image data derived from the aforementioned interpolating calculation are written on the printing medium (step S215), and processing is repeatedly executed based on the read similar original image data until all lines on this image are completely read. The foregoing processing is executed for each of three kind of colors, i.e., red, green and blue in the same manner as mentioned above, whereby magnifying processing (linear magnifying processing) to be executed in the step S110 with the aid of a software (see FIG. 5) is completed.

Figure 5:
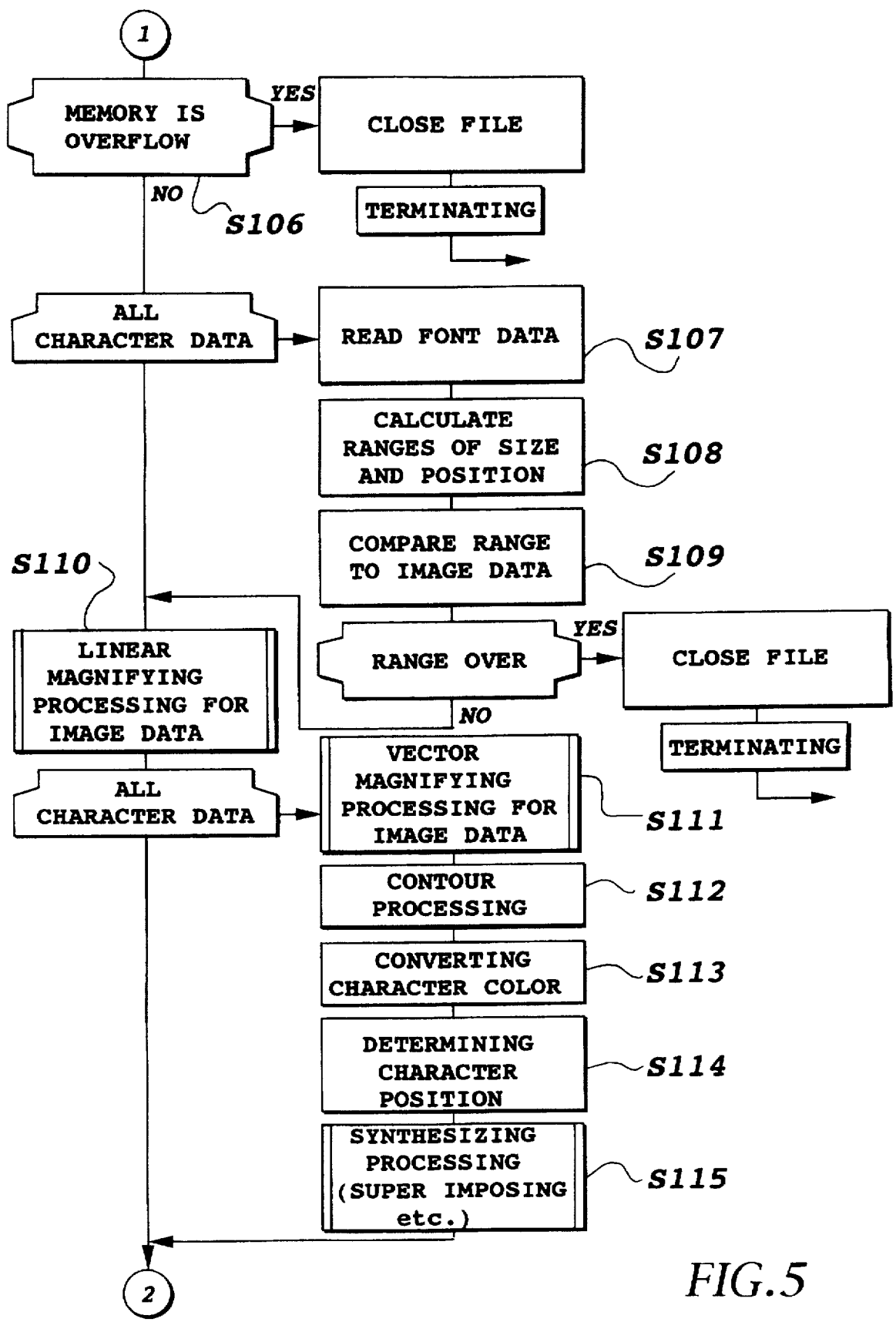
FIG. 5 is another flowchart which illustrates a procedure of executing processings for magnifying and synthesizing with the aid of the host computer for the image forming system.
Figure 6:
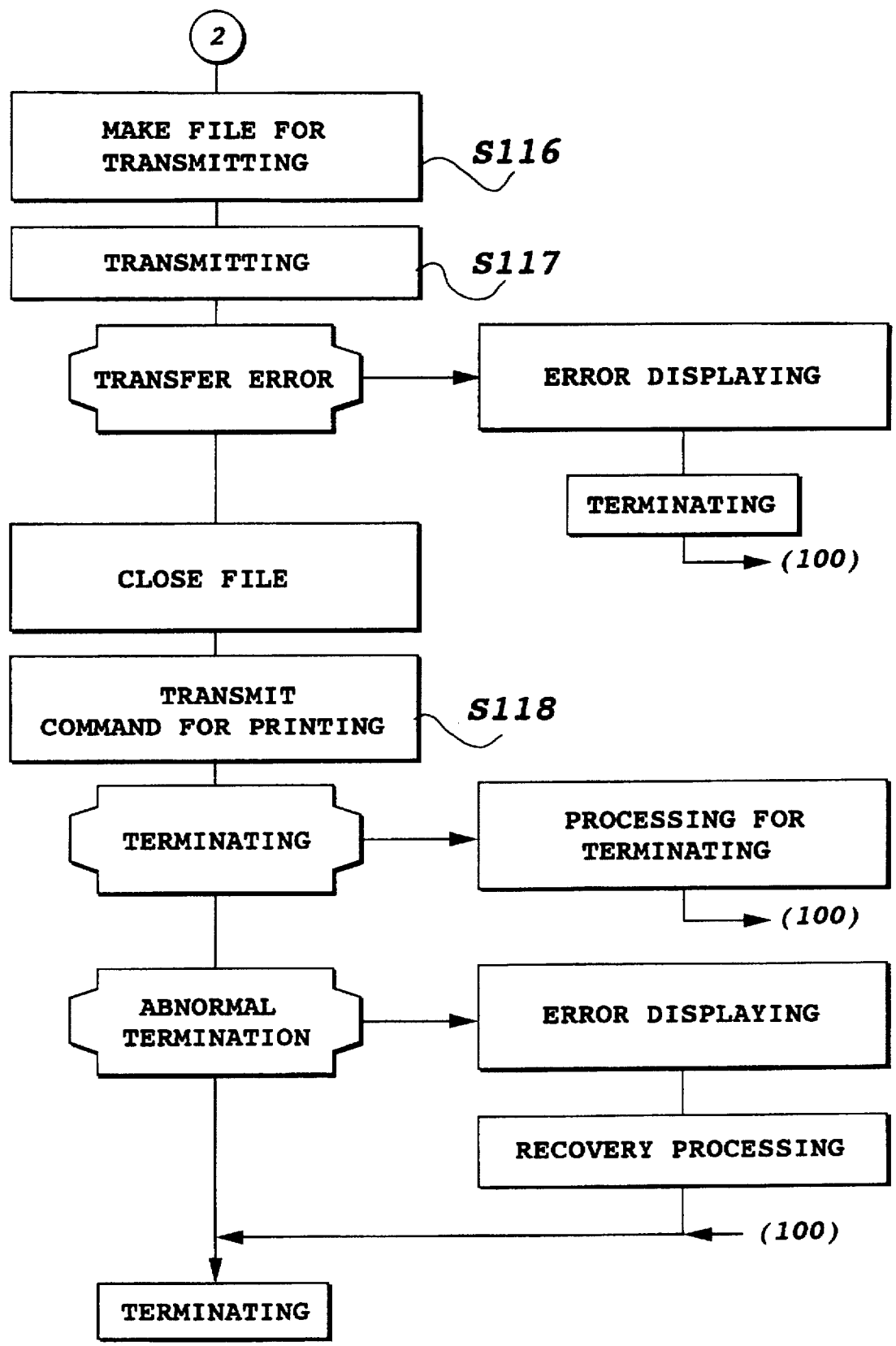
FIG. 6 is further flowchart which illustrates a procedure of executing processings for magnifying and synthesizing with the aid of the host computer for the image forming system.

Referring to FIG. 5 and FIG. 6 again, after the image magnifying processing (step S110) is completed, informations representing character data are read from the image format, and subsequently, the vector magnifying is executed in accordance with the font type and the magnifying rate designated within the working memory range (step S111). After shape corrective adjusting such as contour processing or the like (step S112) is given to character data obtained by the vector magnifying, character color changing is executed (step S113), font position is determined based on the positional informations (step S114), and after the magnifying processing is completed with the aid of a software, image synthesizing is executed on the image data in the additional writing manner (step S115). Subsequently, an image file is prepared by executing the foregoing image synthesizing for all the characters (step S116), whereby magnifying processing is completed with the aid of a software installed in the host computer 1.

Figure 10:
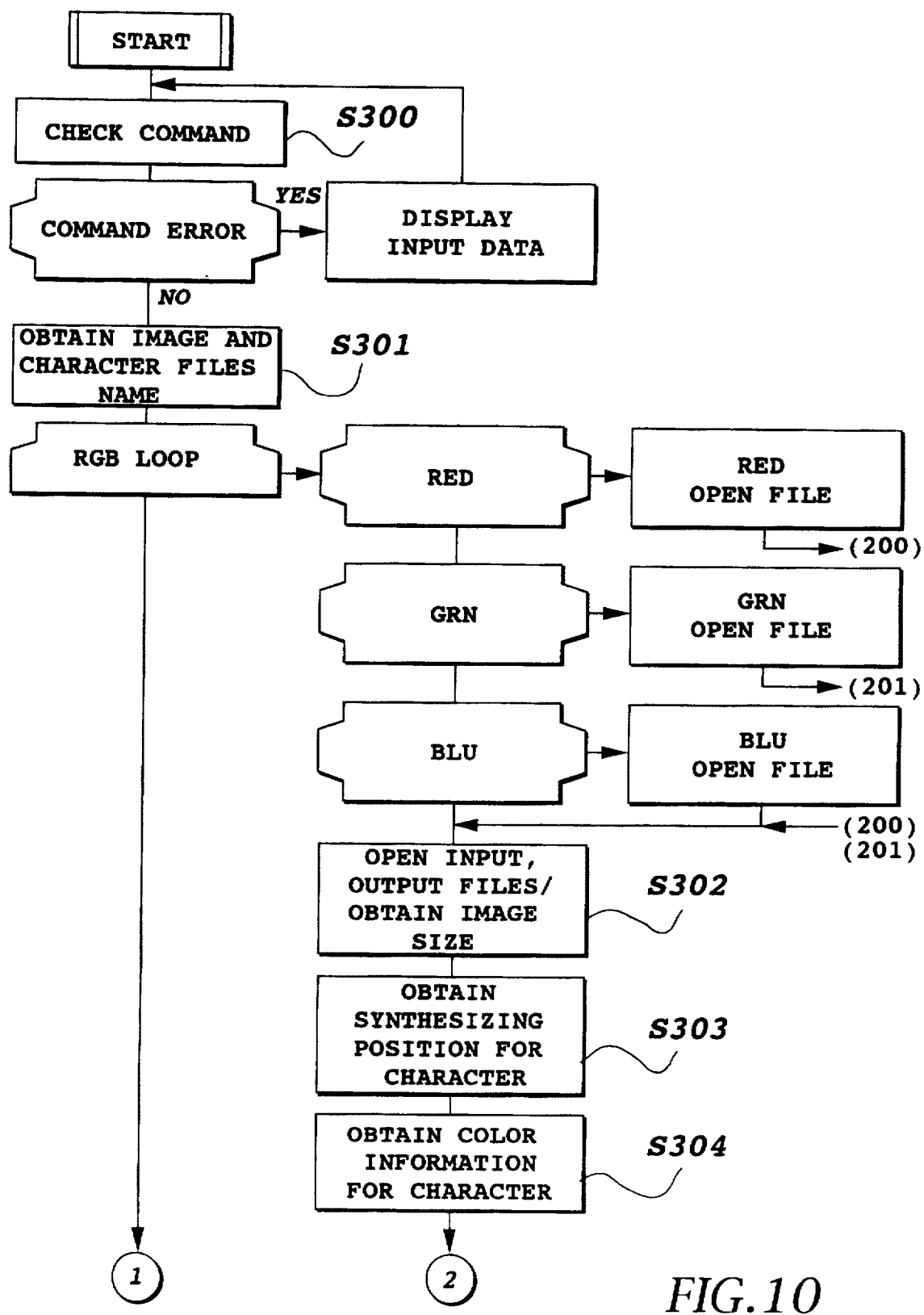
FIG. 10 is a flowchart which illustrates processings for synthesizing in detail.
Figure 11:
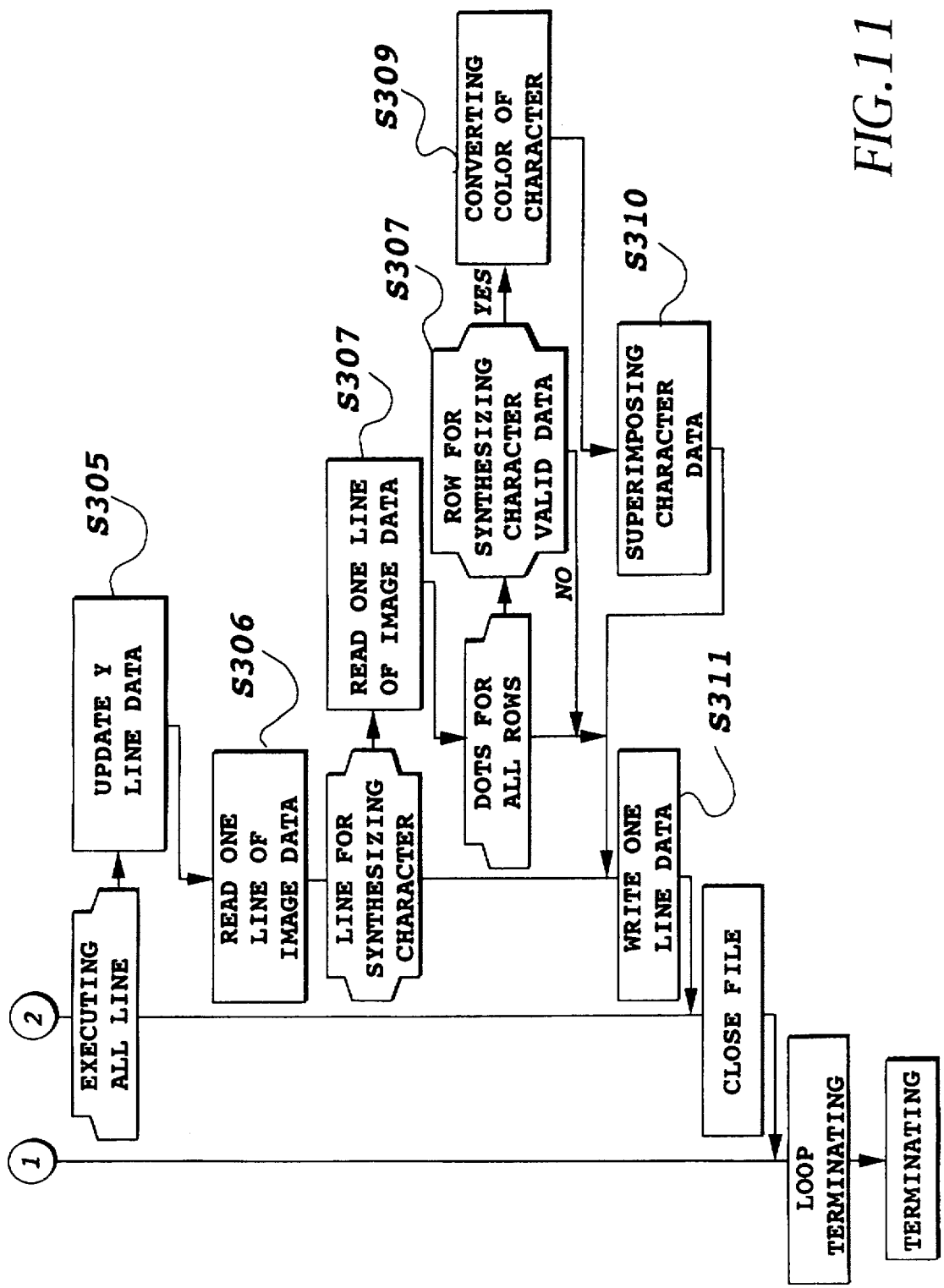
FIG. 11 is another flowchart which illustrates processings for synthesizing in detail.

Next, the synthesizing processing to be executed in the step S115 will be described below in more detail with reference to flowcharts shown in FIG. 10 and FIG. 11.

First, after a command is checked (step S300), a data file number is obtained (step S301), and subsequently, image data are read, causing an image size to be determined (step S302). In addition, informations on character synthesizing positions and informations on character colors are obtained from the image format (step S303, step S304). Next, all the lines of an image are successively updated based on the image size (step S306), and the image data are then read in the by a quantity of single line (step S306). In addition, character data having the same line range as that of the thus read image data are read by a quantity of single line (step S307). The position of this line is dislocated in the line direction, and thereafter, it is determined whether or not the line position is located within the range where the character data are present, and moreover, the character data are effective data (step S308). When it is determined that the line position is located within the range where the character data are present, the character data are changed to another ones in conformity with the preceding informations on character colors (step S309), and the thus changed image data are put on the image data in the additional writing manner (step S310).

When the synthesizing processing is completed by a quantity of single line in the step S310, the thus obtained data are written on the printing medium as new image data (step S311). This operation is performed for all the lines, whereby the synthesizing processing is completed.

When the data processing as mentioned above is completed, the resultant data are transmitted to a memory portion installed in a printer section (step S117). At this time, it is recommendable that reference is made to FIG. 6. The data transmission is achieved in accordance with a save command, and a procedure of data transmission is such that attributes associated with a file name and an image size (represented by pixels present as seen in the vertical direction x pixels present as seen in the transverse direction) are successively transmitted to the memory portion while confirming the data transmission with shaking-hand procedure by individually receiving a confirmation code, and subsequently, the image data are transmitted to the memory portion. The printer section receives image data having a capacity specified based on the image size data, and finally, the data transmission is completed by sending the confirmation code back to the host computer. In the case that other data, that is, an magnifying rate to be determined with the aid of a hardware, a length of printed printing medium or the like are transmitted to the memory section in conformity with other instruction command (step S118). At this time, it is recommendable that reference is made to FIG. 6.

Figure 12A:
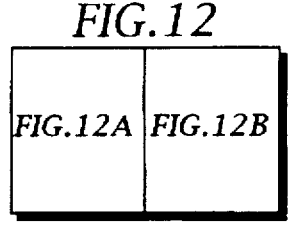
FIG. 12A and FIG. 12B are block diagrams which illustratively show two main structures for a printer 2 employable for the image forming system, respectively.
Figure 12A:
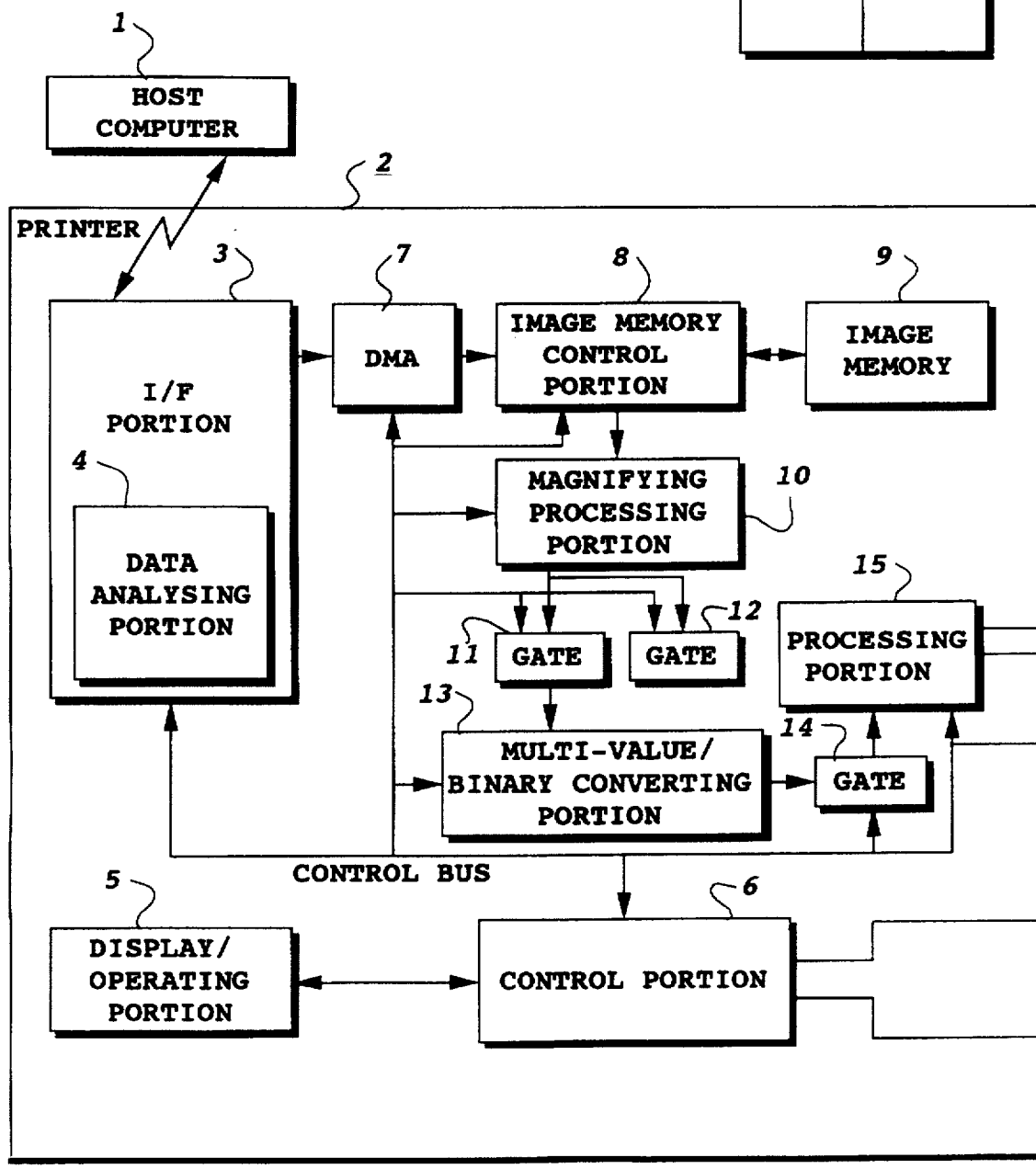
Figure 12B:
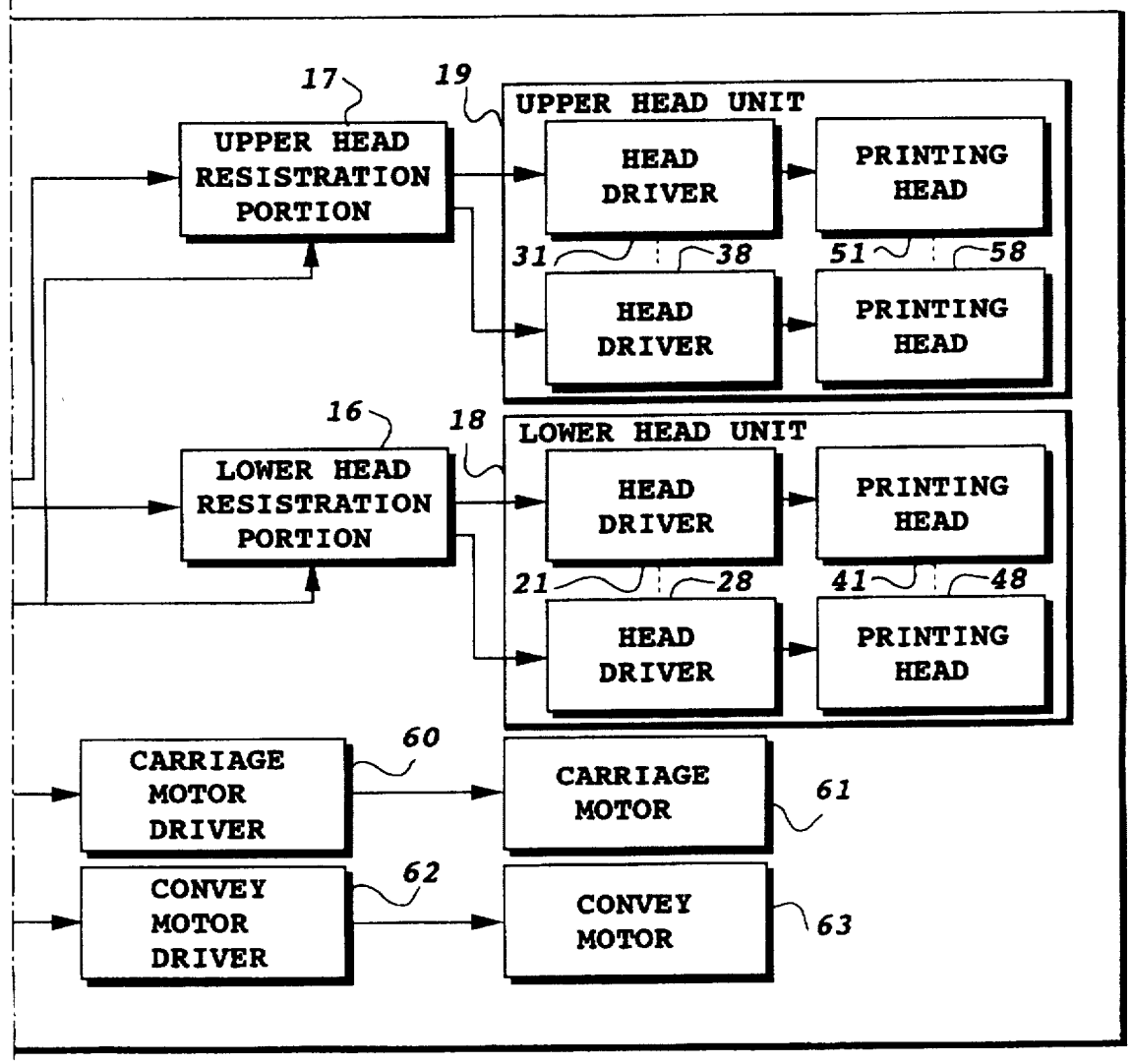

FIG. 12A and FIG. 12B are block diagrams which illustratively show essential components constituting the printer 2 shown in FIG. 1, respectively.

Referring to FIGS. 12A and 12B, the host computer 1 outputs to the printer 2 various kinds of data/commands such as magnified and synthesized image data, an image format or the like. The printer 2 includes an interface portion (hereinafter referred to as I/F portion) 3 which serves to control communication between the host computer 1 and the printer 2, and the I/F portion 3 includes an analyzing portion 4 for analyzing data/commands received by the I/F portion 3.

The image data received by the I/F portion 3 are transmitted to an image memory controlling portion 8 via direct memory access (DMA) controlling portion 7, and thereafter, they are stored in an image memory 9 via the image memory controlling portion 8. The image memory 9 is designed and constructed in the form of a semiconductor memory such as D-RAM, S-RAM or the like.

In addition, the printer 2 includes a magnifying processing portion 10 which is constructed in the form of a hardware for allowing the image data outputted from the image memory 9 to be subjected to magnifying processing (as will be described later). The data processed in the magnifying processing portion 10 are transmitted to a sequential multi-scan (SMS) processing portion 15 via gates 11 and 12 and a multi-value/binary converting portion 13. The data discharged from the SMS processing portion 15 after they are processed in the SMS processing portion 15 so as to allow them to be separately assigned to printing head portions of head units 19 and 18 are subjected to processing in an upper-staged head registration adjusting portion 17 and a lower-staged head registration adjusting portion 16 each serving to adjust an ejecting position. Then the data are fed to both the head units 19 and 18 and thereafter ink is ejected from the respective printing heads. More specifically, head driving portions 21 to 28 and 31 to 38 drive the corresponding printing head portions 41 to 48 and 51 to 58 on the basis of the data in order to eject ink from the latter.

As a carriage motor 61 is rotationally driven, a carriage (to be described later) having head units mounted thereon is moved. On the other hand, as a printing medium conveying motor 63 is rotationally driven, a printing medium is conveyed in a predetermined direction.

In addition, the printer 2 includes a controlling portion 6 which serves to control operations or handlings of respective components constituting the printer 2, and moreover, send and receive data regarding displaying or the like to and from a displaying/actuating portion 5 serving also as an interface for an operator of this system.

Figure 13:
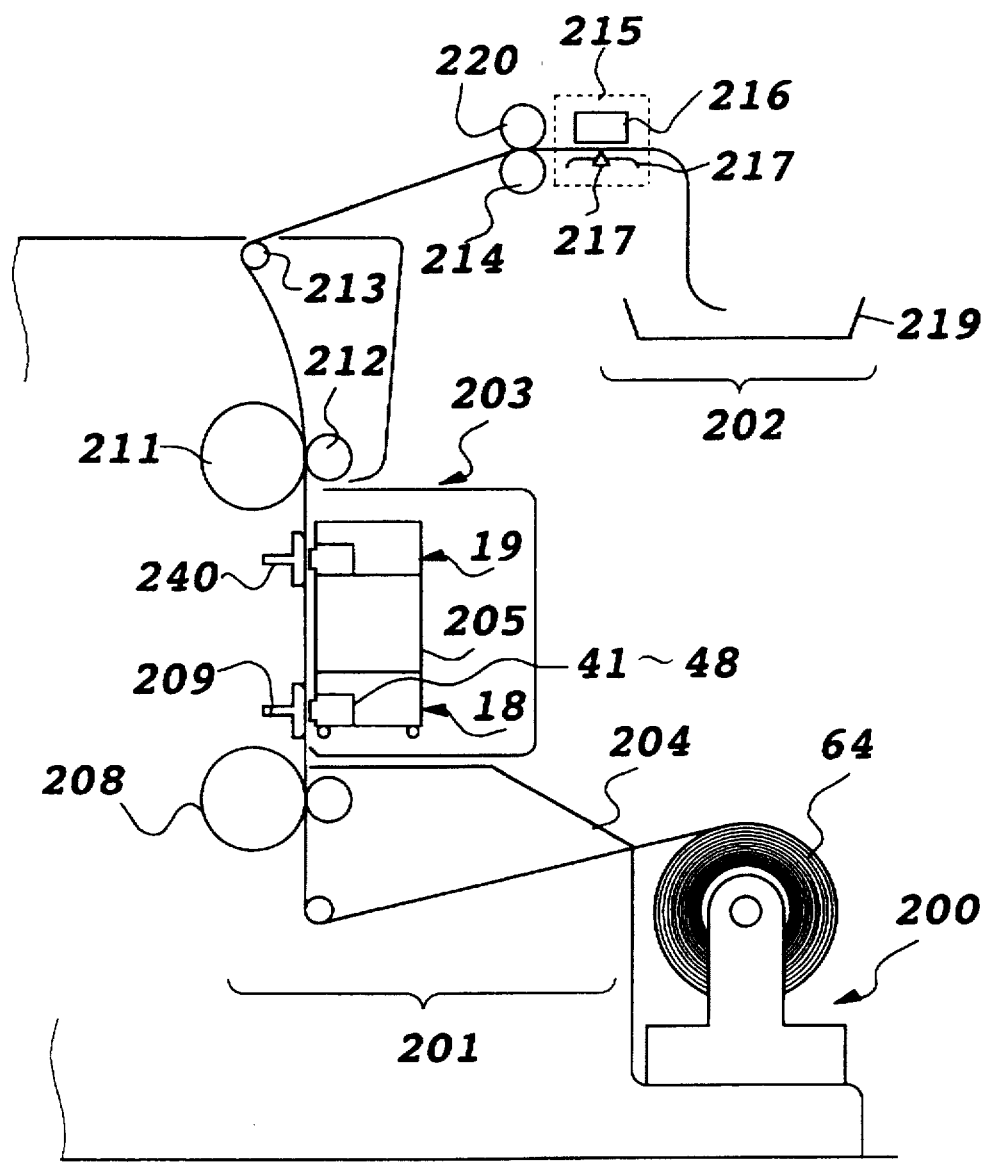
FIG. 13 is a sectional view which shows the mechanical structure employable for the printer 2.

FIG. 13 is a sectional side view of a printing operation portion in the printer 2 constructed in the above described manner as viewed from one side of the printer 2.

The printer 2 is substantially composed of a printing medium feeding section 200 feeding a printing medium 64, a conveying section 201 for exactly stepwise conveying the printing medium 64 fed from the printing medium feeding section 200, a printer unit 203 for performing printing to the printing medium 64 with ink, and a discharging section 202 for cutting the printing medium 64 and discharging the cut printing medium 64 therefrom.

The roll-shaped printing medium 64 is fed from the printing medium feeding section 200 to the conveying section 201 in which it passes between a follower roller 208 and a retaining roller 221 via a guide roller 207 and then passes between a driving roller 211 and a retaining roller 212 to reach the discharging section 202 via a guide roller 213.

The printing medium 64 stepwise conveyed by the driving roller 213 operatively connected to the conveying motor 63 is printed with the ink ejected from the ink jet heads 41 to 48 of the lower-staged head unit 18 mounted on the carriage unit 205 supported on rails 206 while a printing surface of the printing medium 64 is restrictively held by a lower-staged platen 209. The carriage 205 capable of moving with the carriage motor 61 as a driving source performs a printing operation by a quantity of one line (hereinafter referred to as one band) every time it is reciprocably displaced. The printing medium 64 is stepwise conveyed by a predetermined quantity (e.g., quantity corresponding to a width H equal to one band as shown in FIG. 17) every time a printing operation is completed by a quantity of one band, whereby a series of printing operations are successively performed.

Figure 17:
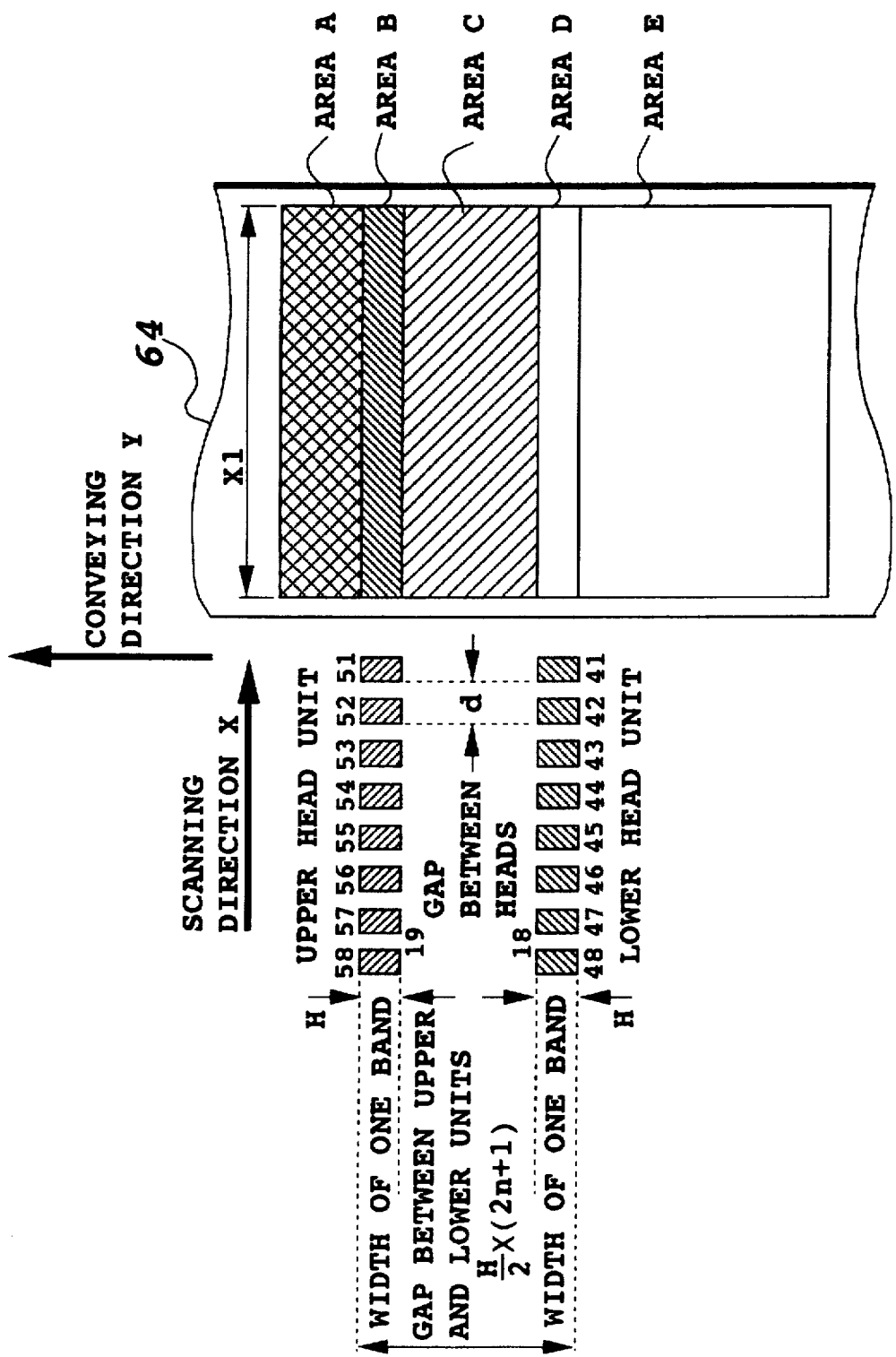
FIG. 17 is an illustrative view which schematically explains the positional relationship between a printing head portion and a printing medium disposed in the printer 2.

When a part of the printing medium 64 printed by the ink jet heads 41 to 48 in the lower-staged head unit 18 reaches the platen 210 because of conveyance of the printing medium 64 by a predetermined quantity (e.g., quantity corresponding to n×H as shown in FIG. 17), it is printed again in the superimposed state by the ink jet heads 51 to 58 in the upperstaged head unit 19.

As each printing operation is achieved in the above-described manner, the printing medium 64 is conveyed to the discharging section 202 via the guide roller 213. The discharging section 202 conveys the printing medium 64 while supporting the latter with the aid of a conveying/driving roller 214 and a retaining roller 220, thereafter, it cuts the printing medium 64 by a predetermined quantity of length by actuating a cutting section 215, and subsequently, the cut part of the printing medium 64 is discharged on a tray 219. The cutting section 215 is substantially composed of a platen 218, a cutting blade 218 and a retaining portion 216.

Figure 14:
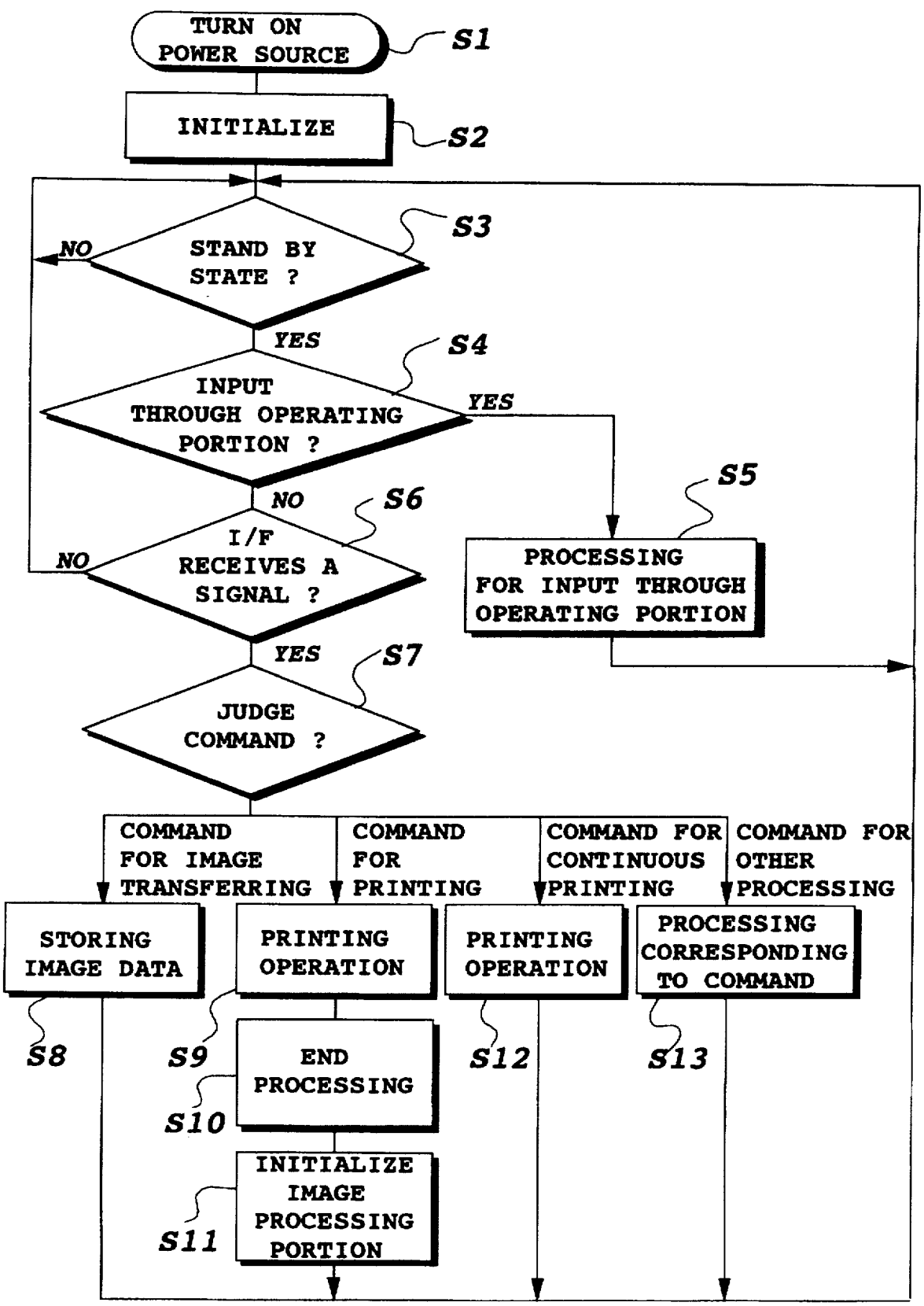
FIG. 14 is a flowchart which illustratively shows a series of steps of operations to be performed by the printer 2.

Next, operations to be performed by the printer 2 shown in FIG. 12 and FIG. 13 will be described below with reference to flowcharts shown in FIG. 14.

First, when a power source for the printer 2 shown in FIG. 12 and FIG. 13 is turned on (step S1), the controlling section 6 checks the initial state of each of various kinds of hardwares, i.e., a RAM portion (not shown), an I/O portion (not shown), a displaying/actuating portion 5, an I/F portion 3 (inclusive of a data analyzing portion 4), a DAM controlling portion 7, an image memory controlling portion 8, an magnifying processing portion 10, a multi-nary/binary converting/processing portion 3, a SMS processing portion 15, a lower-staged head registration adjusting portion 16 and an upperstaged head registration adjusting portion 17. Thereafter, it initializes them, and moreover, allows each of their mechanism parts to perform an initial operation (step S2). For example, this initial operation is such that the lower-staged head unit 18 and the upper-staged head unit 19 are displaced to their home positions by activating a conveying motor 63, a carriage motor 61 and a motor in a recovering system (not shown), and ink is forcibly drained by activating a mechanism in the activating system (e.g., ink sucking mechanism for preventing each ink jet head portion from being clogged with foreign materials). In addition, the controlling section 6 executes initialization processing in such a manner that paths for image data are properly controlled (i.e., controlling of opening/closing of gate circuits 11, 12 and 13), and parameters for a lower-staged head registration adjusting portion 16 and an upper-staged head registration adjusting portion 17 are determined corresponding to the arrangement of ROM (not shown) or backup RAM (not shown) in the controlling section 6.

Next, when the controlling section 6 detects that any abnormality (error) does not arise in each of the components constituting the printer 2 (step S3), it allows (enables) an interface between the host computer 1 and I/F portion 3 to be validated, and thereafter, a message informing that the controlling portion 6 is held in the standby state represented by "READY" or the like is displayed on the screen of the display/actuating portion 5. When it is found that certain abnormality arises in each of the components constituting the printer 2, the step S3 is repeated until the abnormality is obviated, whereby the controlling portion 6 is held in the waiting state.

Next, the controlling portion 6 detects whether an input from the display/actuating portion 5 is present or not (step S4). When it is found that an input from the displaying/actuating portion 5 is present, various kinds of actuation processings such as displaying of the displaying/actuating portion 5, setting of various kinds of parameters or the like are executed in response to various kind of input (step S5). On completion of the actuation processings, the program returns to the step S3. In the case that any input from the displaying/actuating portion 5 is not detected, the program goes to a step S6.

In the step S6, the controlling portion 6 and the data analyzing portion 4 determine whether an input from the host computer 1 is present or not. When it is determined that an input from the host computer 1 is transmitted to the I/F portion 3, the program goes to a step S7, and when it is determined that any input from the host computer 1 is not present, the program returns to the step S3.

In the step S7, the data analyzing portion 4 determines the kind of inputted command (i.e., one of an image transmitting command, a printing operation command, a continuous printing operation command and other kind of command) and then executes command processing corresponding to the foregoing determination.

Concretely, when the inputted command is an image transmitting command, the program goes to a step S8 in which image data receiving/storing processing (as will be described later) is executed, and after completion of the image data receiving/storing processing, the program returns to the step S3.

In the case that the inputted command is a printing operation command, after a printing operation (as will be described later) is performed (step S9), rear end processing (as will be described later) is executed for the upper-staged head unit 19 (step S10), and subsequently, image processing, initialization processing and end processing are executed for the image memory controlling portion 8, the multi-nary/binary conversion processing portion 13 and the upper-staged registration adjusting portion 17 (step S11). After completion of the execution of the foregoing processings, the program returns to the step S3.

In the case that the inputted command is a continuous printing operation command, the same printing operation as that in the step S9 is performed (step S12), and after completion of the printing operation in the step S12, the program returns to the step S3.

When the inputted command is other type of command, processing (of which detailed description is herein eliminated) is executed corresponding to the other type of command (step S13), and after completion of the printing operation in step S13, the program returns to the step S3.

Here, the foregoing image data receiving/storing processing will be described below with reference to FIG. 15.

Figure 15:
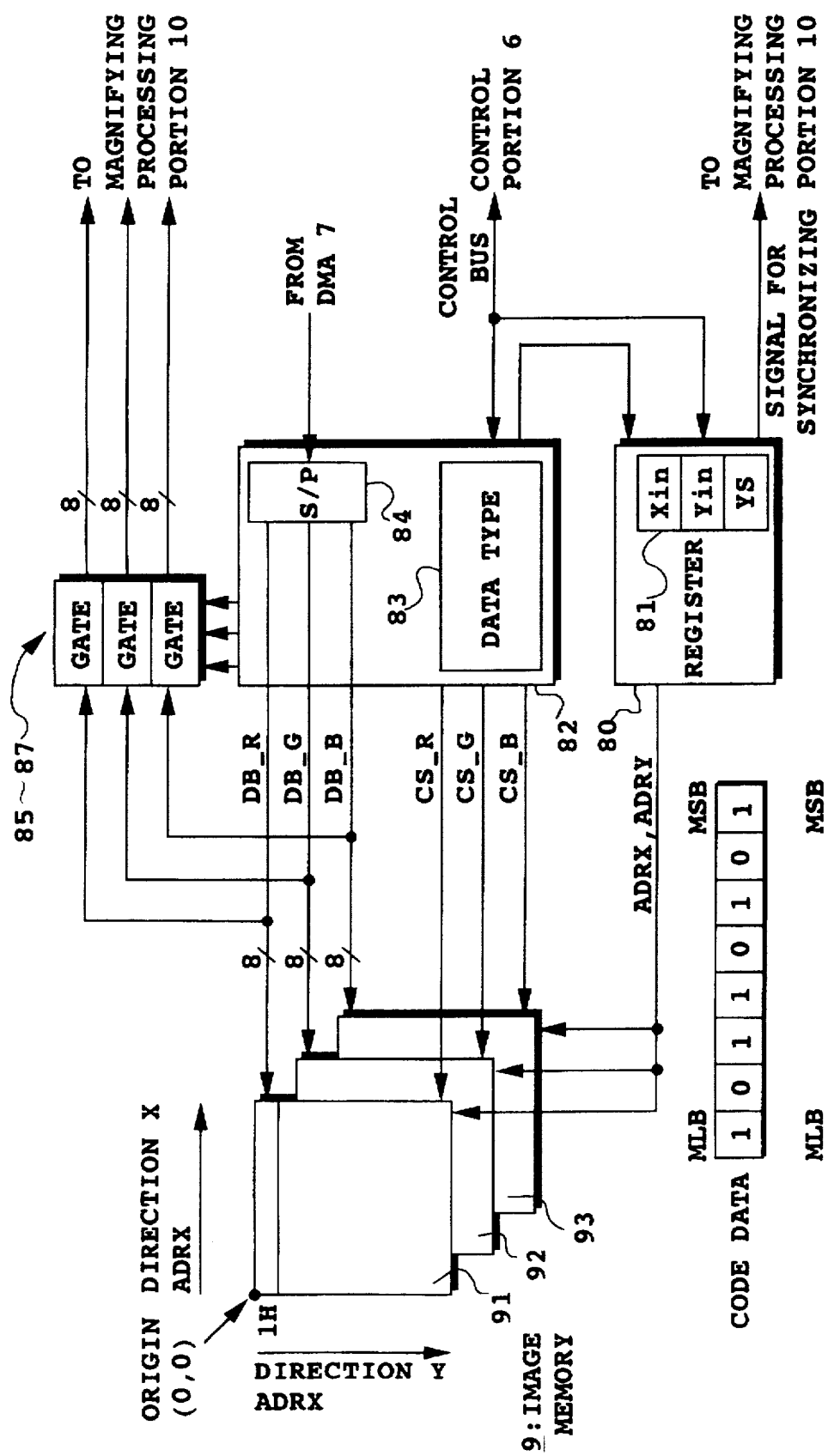
FIG. 15 is an illustrative view which schematically explains the structure of an image memory 9 disposed in the printer 2 and the relationship between multi-value data and binary data.
Figure 16B:
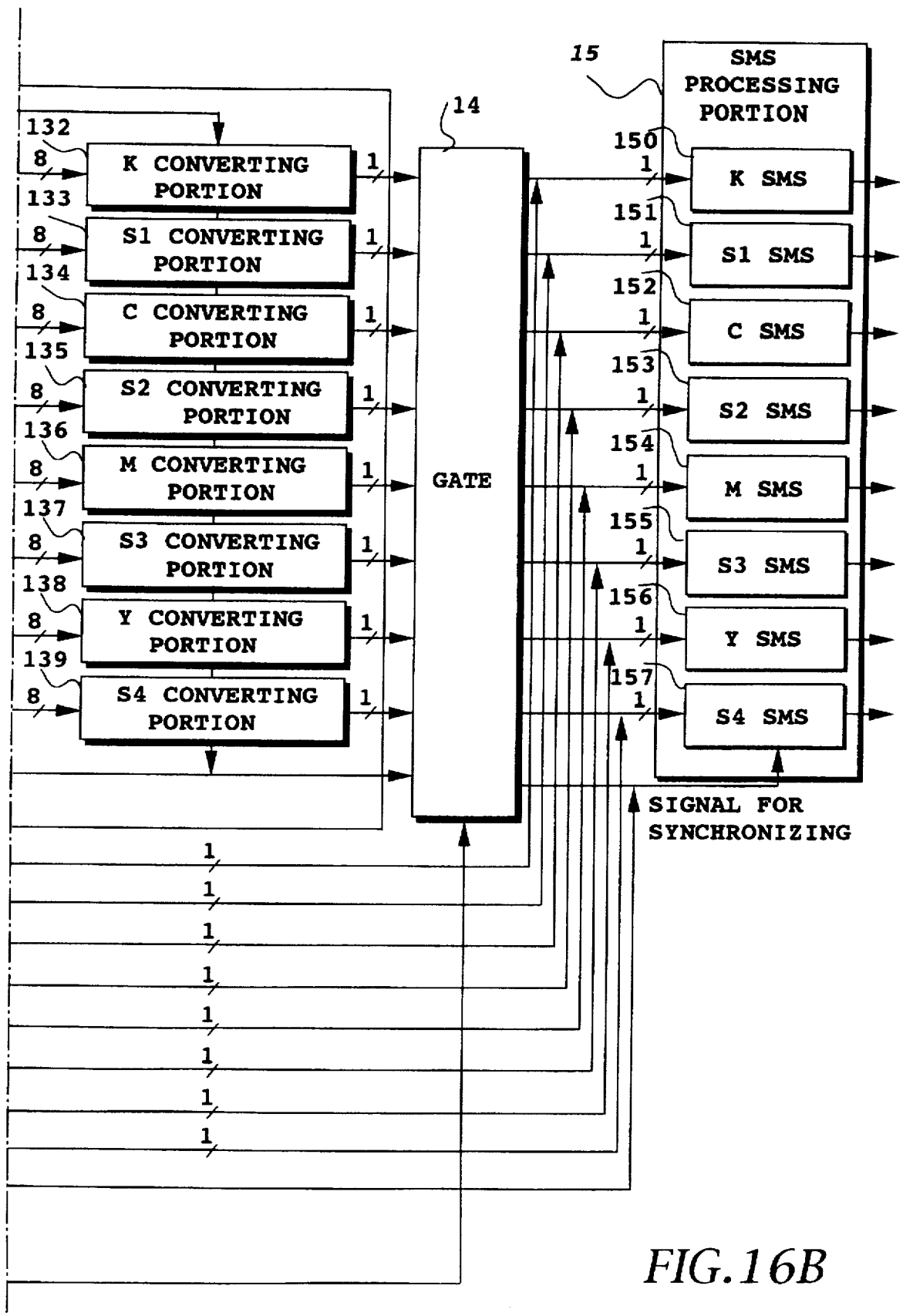

FIG. 15 is a block diagram which illustratively shows the detailed structure of the image memory controlling portion 8 shown in FIG. 12.

The image transmitting command is composed of a command portion and a parameter portion, and the parameter portion is substantially composed of an image size (Xin, Yin) and an image file name (inclusive of an magnifying factor). After an image transmitting command is fed, image data are continuously fed to the image memory controlling portion 8 by a quantity corresponding to the image size (Xin, Yin). The data type of image data is determined based on the magnifying factor of the image file name. For example, when the data type of inputted image data is three stimulus values (R, G, B), an magnifying factor [. RGB] is added to the image file name, when the inputted image data are code data, an magnifying factor [. P] is added to the image file name, and when the inputted image data are binary data, an magnifying factor [. ] is added to the image file name. While the foregoing state is maintained, the host computer 1 sends an image transmitting command (e.g., AVE, TET. RGB, 256, 256) to the printer 2. When the printer 2 receives the image transmitting command, the controlling portion 6 discriminates the data type of image data based on the magnifying factor of the image file name, and the thus discriminated data type is then represented in the form of a code which in turn is stored in a work RAM (not shown) disposed in the printer 2. Subsequently, the image size and the data type each represented in the form of a code are notified to the image memory controlling portion 8. In response to the thus notified image size and data type, the image memory controlling portion 8 stores the image size (Xin, Yin) in a register 81 of an address controlling portion 80, and moreover, it stores the data type in a register 83 of a bus controller 82.

In the case that the data type of image data stored in the register 83 is multi-value data, the bus controller 82 allows chip select C_R, C_G and C_B signals to be validated, and moreover, it allows a serial/parallel converting portion (hereinafter referred to as S/P) 84 to be also validated. Subsequently, when image data (R, G, B) are transmitted from a DMA controller 7 in accordance with the point order, they are distributed in the S/P 84 and then transmitted to image buses DB_R, DB_G and DB_B. The address controlling portion 80 is operated in such a manner that the data transmitted to the image buses DB_R, DB_G and DB_B are stored in a same address (ADRX=0, ADRY=0) of the image memories 91, 92 and 93, the address ADRX is incremented by a quantity of +1, image data (R, G, B) of a next pixel are stored in a next address (ADRX=1, ADRY=0), and when image data are stored in the address (ADRX=1, ADRY=0) by a quantity of one raster (corresponding to Xin pixels), the address ADRY is incremented by a quantity of +1. Consequently, image data are stored in the next address (ADRX=1, ADRY=0) by a quantity of one page by repeating the aforementioned processings.

In addition, in the case that the data type of image data stored in the register 83 is code data or binary data, the bus controller 82 allows only the chip select C_R signal outputted from the image memory 91 to be validated. At this time, the S/P 84 is invalidated. Thus, when the image data (code data) are transmitted from the DMA controller 7 in accordance with the point order, the S/P 84 sends the image data to the image bus DB_R so that the address controlling portion 80 executes the same address controlling as mentioned above, causing code data or binary data corresponding to one page to be stored in an image memory 91 with a bit structure including one pixel (see FIG. 15). It should be noted that since address increment is executed every image data corresponding to one pixel, it is completed for a short period of time about three times than that in the case of multi-value data (strictly speaking, since image data are not transmitted from the host computer 1 in complete synchronization with each other, address increment can not be completed merely for a short period of time about three times).

When the image data are stored in the image memory 91, gates 85 to 87 are kept closed, whereby a part of the synchronized signals (band enable signal BVE, video enable signal VE, image clock CLK or the like) to be outputted from the address controlling portion 80 is not practically outputted therefrom. Specifically, when the image data are stored in that way, they are not outputted to the magnifying processing portion 10, causing the image data on an input image bus of the magnifying processing portion 10 to be invalidated. Only when the band enable signal BVD is equal to 1 and the video enable signal VE is equal to 1, the image data are validated so that they are transmitted in synchronization with the clock CLK.

Next, a printing operation to be performed by the printer 2 will be described below with reference to FIG. 12 and FIG. 15 to FIG. 17.

On receipt of a printing command or a continuous printing command, the controlling portion 6 sets an magnifying rate applicable to the magnifying processing portion 10 with reference to an instruction given by other command on the image format shown in FIG. 19 and then determines the flow of image data (inclusive of synchronized signals) so that the operative state of the image memory controlling portion 8 is shifted from an image storing mode to an image outputting mode (wherein the gates 85 to 87 are kept opened, the S/P 84 is kept closed, and the selectors C_R, C_G and C_B are held in the same state as that at the time of image storing). At the same time, initialization (to be executed under conditions that ADRX is set to zero, ADRY is set to zero and Y is set to zero in the address controlling portion 80) and setting of the printing mode (to be executed under a condition that an output size (Xout, Yout) instructed by other command is set in the register 81 of the address controlling portion 80) are practically executed so that the image data are sequentially outputted from the image memory 9 with one band as a unit while maintaining the correct timing relationship relative to activation of the carriage motor 61, causing a printing operation for one band to be first performed by the lower-staged head unit 18.

In the case that the data type of image data is a multi-value data, the flow of image data is maintained in such a manner that the controlling portion 6 closes a gate 11a of the gate 11 and the gate 12 via the controlling bus and opens a gate 11b of the gate 11 and a gate 14, whereby the image data (R, G, B) outputted from the magnifying portion 10 are converted into multi-value data for an ink color system (k, S1, C, S2, M, S3, Y, S4) in a masking processing portion 130 in the multi-value/binary converting portion 13, subsequently, the thus converted image data are converted into binary data for respective ink colors (k, S1, C, S2, M, S3, Y, S4) in converting portions 132 to 139 of the ink color (k, S1, C, S2, M, S3, Y, S4) system, and thereafter, the thus converted image data are outputted to the SMS processing portion 15.

In addition, in the case that the data type of image data is code data, the controlling portion 6 closes the gate 11b and the gate 12 via the controlling bus and opens the gate 11a and the gate 14, whereby the code data are converted into multi-value data of the ink color (k, S1, C, S2, M, S3, Y, S4) system in a table converting processing portion 131, and subsequently, the thus converted code data are processed via the same route as that in the case of multi-value data. Incidentally, a content of a table of the table converting portion 131 is fed from the host computer 1 in conformity with a command different from the image transmitting command, and the controlling portion 6 can set the foregoing table via the controlling bus.

Additionally, in the case that the data type of image data is binary data, the controlling portion 6 closes the gate 11a, the gate 11b and the gate 14 via the controlling bus and opens the gate 12, whereby binary data for each ink color to be outputted from the magnifying processing portion 10 are outputted directly to the SMS processing portion 15.

When the binary data obtained by each of the aforementioned processings are inputted into a SMS processing portion 15, processings are executed in a plurality of SMS processing portions 150 to 157 corresponding to the respective colors in the SMS processing portion 15, whereby binary data for a plurality of lower-staged printing head portions 41 to 48 and binary data for a plurality of upper-staged printing head portions 51 to 58 are sequentially prepared, causing them to be fed to the lower-staged head registration adjusting portion 16 and the upper-staged head registration adjusting portion 17. The lower-staged head registration adjusting portion 16 allows binary data for each ink color to be simultaneously stored in the relevant memory by a quantity corresponding to one band, and to assure that registration adjusting in the scanning direction X is properly conducted with a K-colored printing head 41 as a reference, a memory reading start time is delayed by a quantity of one band. While the foregoing state is maintained, the binary data for each ink color are fed to a plurality of ink head driving portions 21 to 28. On the other hand, the upper-staged head registration adjusting portion 17 allows binary data for each ink color to be simultaneously stored in the relevant memory by a quantity corresponding to one band but the image data are not outputted therefrom at the time of one band.

After an image corresponding to one band is printed on the printing medium 64 via single scanning, the rotation of the carriage motor 61 is reversed, and subsequently, the carriage unit 205 is dislocated to a printing operation start position (located in the vicinity of the left-hand end of the printing medium rather than the home position). To this end, the conveying motor 17 is rotationally driven so as to allow the printing medium 64 to be displaced in the Y arrow-marked direction by a predetermined quantity corresponding to a width H of the printed one band. Thus, an image is formed on the next band of the printing medium 64.

When an image is formed on each of subsequent bands of the printing medium 64, the controlling portion 6 informs the image memory controlling portion 8 of an output address (foremost end address Y having image data to be outputted stored therein), and subsequently, an image is formed on the printing medium 64 based on the output address by a quantity corresponding to one next band in the same manner as mentioned above by feeding a printing operation start command to the image memory controlling portion 8 via the controlling bus. Incidentally, an increment of the foremost end address Y varies depending on how the magnifying processing is executed. When the foremost end address Y is increased as long as two times (by a quantity corresponding to 100%), the increment of the foremost end address Y corresponds to the number of pixels located within the range of a band width of 1H.

In the case that a gap between the lower-staged head unit 18 and the upper-staged head unit 19 (i.e., gap between upper and lower units) is represented by $H\times(2n+1)/2$ as shown in FIG. 17 when images are sequentially formed by performing scanning in the aforementioned timing relationship and then forming an image on one band of the printing medium 64, the lower-staged head unit performs a printing operation by a quantity of corresponding to n bands, and subsequently, when a printing operation is started for a next band, image data corresponding to a quantity corresponding to a half band as measured from the upper-staged head registration adjusting portion 17 in the Y-arrow marked direction Y are read with delay based on the K-colored reference for each color, and thereafter, a printing operation is achieved for the read band portion by the upper-staged head unit.

When the controlling portion 6 detects that a printing operation is completed by a quantity corresponding to the instructed number of bands Yout/ (the number of pixels corresponding to the band width of 1H), performing of the printing operation is terminated. For the purpose of simplification of description. Yout is represented by a multiple of the number of pixels corresponding to the band width of 1H. As is best seen in FIG. 17, when each printing operation is completed, the printing medium 64 includes a region A printed by the upper-staged and lower-staged head units 18 and 19, regions B and C (represented by H×(2n+1)/2) printed only by the lower-staged head unit 18 and regions D and E having no printing operation performed therefore.

In the case that a printing operation is performed in conformity with a printing operation command, next rear end processing is executed and the image processing portion is initialized, and thereafter, the program returns to the standby state.

Here, the rear end processing is such that the regions B and C which are already subjected to printing only by the lower-staged head unit 18 is subjected to printing again by the upper-staged head unit 19, and at this time, the lower-staged head unit 18 does not perform any printing operation. In other words, the rear end processing represents the state that an image on the printing medium 64 is printed on the latter by the upper-staged and lower-staged head units 18 and 19 till the rear end thereof.

In addition, the initialization of the image processing portion represents a processing for clearing address control, especially, for the memory having intermediate data or image data for image processing held therein. Concretely, this processing corresponds to a processing to be executed by the multi-value/binary converting portion 13 and the upper-staged head registration adjusting portion 19. Specifically, an error dispersing method or a similar process that is one of area gradation appearing in the course of quasi-intermediate processing is employed for the multinary/binary converting portion 13. Once the error dispersing method or a similar process is employed in that way, image continuance is maintained by storing in the memory the error data to be dispersed to a next band after one band of the printing medium 64 is printed. However, this state is cleared because the image continuance is not required when a usual printing operation (inclusive of rear end processing) is completely achieved in conformity with a printing operation command, and moreover, it is not required for printing next new image data. Additionally, since the image data stored in a memory (not shown) in the upper-staged head registration adjusting portion 19 are not required, an address controlling portion (not shown) for the memory is cleared.

On the other hand, in the case of a continuous printing operation command, after completion of a printing operation, the host computer 1 is restored to the standby state not only without any execution of the rear end processing but also without any initialization of the image processing portion, whereby the host computer 1 is ready to receive next image data. In the case that the host computer 1 receives an image transmitting command again, image data storing processing is executed. In addition, in the case that the host computer 1 receives a continuous printing operation command, the continuance of the image processing system is maintained by performing a subsequent printing operation (if image data to be transmitted are continuous, continuance of the image data is maintained). Thus, different continuous images can continuously be printed on the printing medium 64 by repeating the foregoing processings. When the continuous printing operation is to be terminated, a printing operation command is instructed to final image data to be transmitted, whereby the printing operation, the rear end processing and the image processing portion are initialized. On completion of the initialization, the continuous printing operation is terminated.

Figure 18:
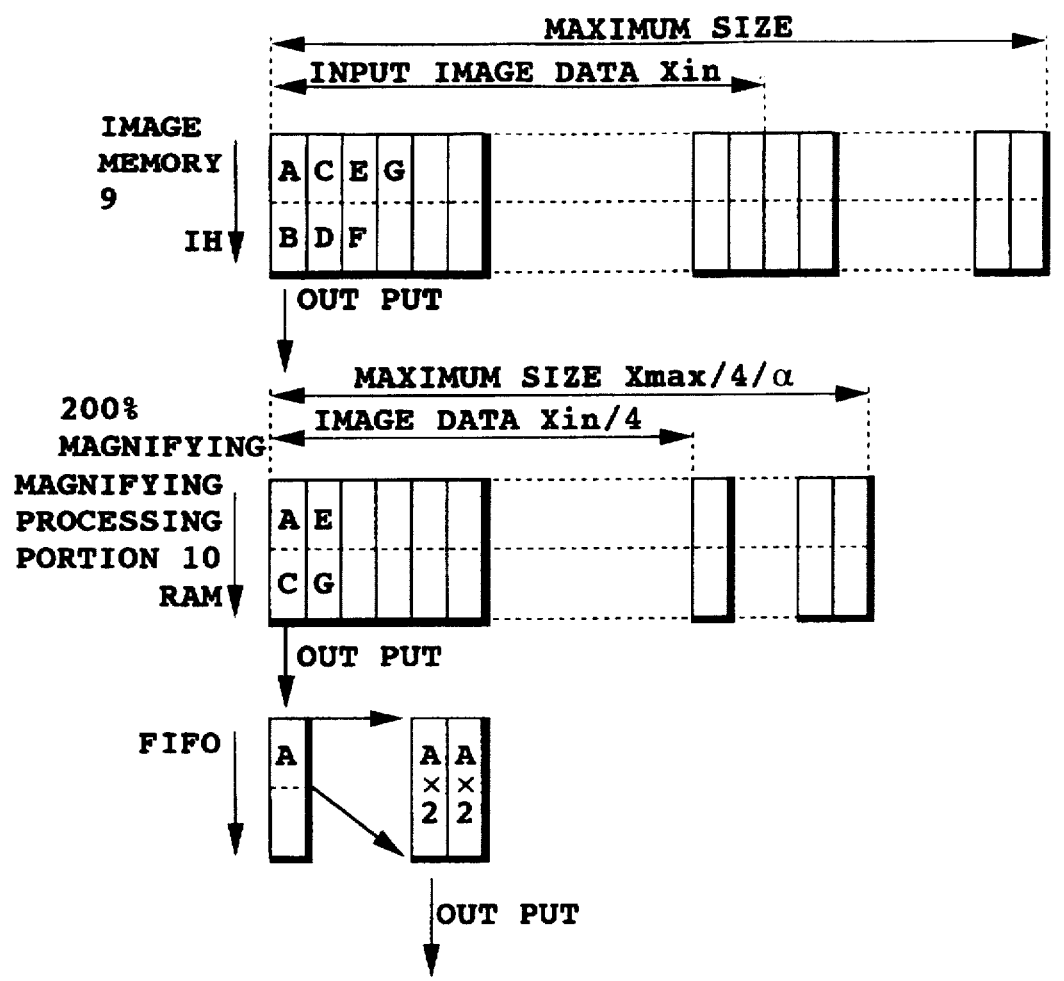
FIG. 18 is an illustrative view which schematically shows processings to be executed by an magnifying processing section 10 of the printer 2 with the aid of a hardware.

Next, an outline of processing to be executed by the magnifying processing portion 10 will be described below with reference to FIG. 18.

The embodiment shown in FIG. 18 will be described by exemplifying the case of magnification by a quantity of 200%. In this embodiment, since magnifying processing is executed at a high speed with a reduced scale of hardware, the magnifying processing can be achieved by repeating simple pixels. For example, in the case that an original image defined by four pixels×four pixels is magnified by a quantity of 200% to assume an magnified image defined by eight pixels×eight pixels, magnification of the pixels on an original image is twice repeated not only in the transverse (X) direction but also in the vertical (Y) direction so that four pixels each having same image data are formed as represented by an equation of 2×2=4.

In this embodiment, when the foregoing magnifying processing is executed by a quantity of 200%, inputted image data are stored in a memory (having a maximum size of Xmax) of an image memory 9 (only a register 91 shown in the drawing) by a quantity corresponding to a size of Xin as seen in the X direction. Image data corresponding to a width of each band are sequentially outputted from the image memory 9 to an magnifying processing portion 10 in accordance with the order represented by A, B, C, D, E, F, G, . . . , and subsequently, the magnifying processing portion 10 reads A with slight delay so as to allow A to be outputted to FIFO (not shown) thereof while storing a half band width (at the time of magnification of 200%) in RAM in accordance with the order represented by A, C, E, G, . . . . At this time, FIFO magnifies the image data of A by a quantity of A×2 in the vertical (Y) direction by reading the image data of A with slight delay at a speed reduced by a half from that of an image clock CLK while storing the image data of A therein. Thereafter, while the reading point of FIFO is restored to the initial one, the image data of A×2 are magnified also in the transverse (X) direction by reading A again likewise at a speed reduced by a half from that of the image clock CLK. On completion of the magnification of the image data of A by a quantity of 200%, next image data of C are written in FIFO from RAM so that they are magnified by a quantity of 200% by executing the same processings as mentioned above. Similarly, image data of E, G, . . . and a half band width×Xin are magnified by a quantity of 200%, causing an image on one band to be printed on the printing medium 64. Next, a reading start address Y in a register 81 of an address controlling portion 80 in the image memory controlling portion 8 is incremented by a quantity corresponding to pixels present across a half band width, whereby images B, D, F . . . located ahead of the image memory 9 by a distance corresponding to a half band width as seen in the Y direction are read in the same manner as mentioned above so as to likewise execute magnifying processing by a quantity of 200%.

The magnifying processing portion 10 can form one pixel, two pixels, four pixels, eight pixels, sixteen pixels . . . by repeating the foregoing magnifying processing based on one pixel by applying an magnifying rate of 100% (single multiple), 200%, 400%, 800%, 1600% . . . and $2^n \times 100\%$ (n=0, 1, 2, 3 . . . ). At this time, a band width to be stored in RAM of the magnifying processing portion 10 is set to one band, a half band, ¼ band, ⅛ band, 1/16 band, . . . , a reading speed of FISO is set to one multiple, ½, ¼, ⅛, 1/16, . . . of the image clock, and the number of reading times of FISO is set to 1, 2, 4, 8, 16, . . . and a reading start address Y of the image memory controlling portion 8 is incremented by a quantity of pixel corresponding to one band, half band, ¼ band, ⅛ band, 1/16 band . . . , whereby magnifying processing can be executed in the same manner as mentioned above.

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. As examples of the recovery system, are a capping means and a cleaning means for the recording head, and a pressure or suction means for the recording head. As examples of the preliminary auxiliary system, are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An image forming system including an image processing section and a printing section to perform printing based on image data, comprising:

first processing means for executing processing inclusive of image data magnifying processing by means of software based on a first magnifying rate;

second processing means for executing the image data magnifying processing by means of hardware based on a second magnifying rate; and printing operation controlling means for allowing said printing section to execute a printing operation based on the image data which have been subjected to magnifying processing executed by said first processing means and said second processing means, wherein said first magnifying rate and said second magnifying rate are determined based on a resolution of printing performed by said printing section, a processing load to be borne by said first processing means and a capacity of an image data memory involved in said printing section.

2. An image forming system as claimed in claim 1, wherein said second processing means make the image data of a plurality of pixels from the image data of one pixel, so as to execute the image data magnifying processing.

3. An image forming system as claimed in claim 1, wherein said printing section uses an ink jet head having an ink ejection opening for ejecting an ink and performs printing by ejecting the ink from the ink jet head.

4. An image forming system as claimed in claim 3, wherein the ink jet head has thermal energy generating means and produces a bubble in the ink by using thermal energy to eject the ink from the ink ejection opening.

5. An image forming system as claimed in claim 1, wherein said first magnifying rate and said second magnifying rate are determined further based on a resolution of image data.

6. An image forming system including an image processing section and a printing section to perform printing based on the image data associated with a plurality of kinds of image data, comprising:

processing means for executing processing inclusive of magnifying processing with respect to each of said plurality of kinds of image data based on a first magnifying rate;

synthesizing processing means for synthesizing said plurality of kinds of image data each of which is magnified by said processing means, based on a synthesizing information;

magnifying processing means for executing magnifying processing for the image data synthesized by said synthesizing processing means, based on a second magnifying rate; and printing operation controlling means for allowing in said printing section to execute a printing operation based on the image data which have been subjected to magnifying processing executed by said magnifying processing means.

7. An image forming system as claimed in claim 6, wherein said processing means is constructed by software, and said magnifying processing means is constructed by hardware.

8. An image forming system as claimed in claim 7, wherein said processing means is constructed in said image processing section, and said magnifying processing means is constructed in said printing section.

9. An image forming system as claimed in claim 8, wherein said first magnifying rate and said second magnifying rate derived from said preset image format are determined depending on an image memory capacity of said printing section, a resolution of said plural kinds of image data and a resolution of said printing section itself in such a manner that a quantity of memories usable for said image memory is maximized or a resolution of outputting of the printing operation to be executed by said printing section is maximized.

10. An image forming system as claimed in claim 9, wherein said plurality of kinds of image data include font data, and said processing means executes contour forming processing for said font data.

11. An image forming system as claimed in claim 10, wherein said printing section forms gas bubbles in ink by applying thermal energy to said ink and ejects said ink on formation of said gas bubbles, so as to execute the printing operation.

12. An image forming system as claimed in claim 6, wherein said first magnifying rate and said second magnifying rate are determined based on a capacity and an image data memory for storing image data for printing, resolutions of the plurality of kinds of image data and a resolution of printing performed by said printing section.

13. An image forming method comprising the steps of:

dividing a magnifying rate used when a magnified image is printed on a printing medium based on image data, into a plurality of partial magnifying rates, a product of said plurality of partial magnifying rates multiplied by each other representing said magnifying rate;

executing a plurality of magnifying processings at said partial magnifying rates, respectively, by executing processing inclusive of at least magnifying processing by means of hardware and software; and executing a printing operation based on the image data obtained by said plurality of magnifying processings, wherein said plurality of partial magnifying rates are determined based on at least one of a resolution of printing performed by said printing section, a processing load to be borne by said first processing means and a capacity of an image data memory involved in said printing section.

14. An image forming system including an image processing section and a printing section to perform printing based on image data, comprising:

first processing means for executing processing inclusive of image data magnifying processing by means of software based on a first magnifying rate;

second processing means for executing the image data magnifying processing by means of hardware based on a second magnifying rate; and printing operation controlling means for allowing said printing section to execute a printing operation based on the image data which have been subjected to magnifying processing executed by said first processing means and said second processing means, wherein said first magnifying rate and said second magnifying rate are determined based on a resolution of printing performed by said printing section.

15. An image forming system as claimed in claim 14, wherein said second processing means make the image data of a plurality of pixels from the image data of one pixel, so as to execute the image data magnifying processing.

16. An image forming system as claimed in claim 14, wherein said printing section uses an ink jet head having an ink ejection opening for ejecting an ink and performs printing by ejecting the ink from the ink jet head.

17. An image forming system as claimed in claim 16, wherein the ink jet head has thermal energy generating means and produces a bubble in the ink by using thermal energy to eject the ink from the ink ejection opening.

18. An image forming system as claimed in claim 14, wherein said first magnifying rate and said second magnifying rate are determined further based on a resolution of image data.

19. An image forming system including an image processing section and a printing section to perform printing based on image data, comprising:

first processing means for executing processing inclusive of image data magnifying processing by means of software based on a first magnifying rate;

second processing means for executing the image data magnifying processing by means of hardware based on a second magnifying rate; and printing operation controlling means for allowing said printing section to execute a printing operation based on the image data which have been subjected to magnifying processing executed by said first processing means and said second processing means, wherein said first magnifying rate and said second magnifying rate are determined based on a processing load to be borne by said first processing means.

20. An image forming system as claimed in claim 14, wherein said second processing means make the image data of a plurality of pixels from the image data of one pixel, so as to execute the image data magnifying processing.

21. An image forming system as claimed in claim 14, wherein said printing section uses an ink jet head having an ink ejection opening for ejecting an ink and performs printing by ejecting the ink from the ink jet head.

22. An image forming system as claimed in claim 21, wherein the ink jet head has thermal energy generating means and produces a bubble in the ink by using thermal energy to eject the ink from the ink ejection opening.

23. An image forming system as claimed in claim 19, wherein said first magnifying rate and said second magnifying rate are determined further based on a resolution of image data.

24. An image forming system including an image processing section and a printing section to perform printing based on image data, comprising:

first processing means for executing processing inclusive of image data magnifying processing by means of software based on a first magnifying rate;

second processing means for executing the image data magnifying processing by means of hardware based on a second magnifying rate; and printing operation controlling means for allowing said printing section to execute printing operation based on the image data which have been subjected to magnifying processing executed by said first processing means and said second processing means, wherein said first magnifying rate and said second magnifying rate are determined based on a capacity of an image data memory involved in said printing section.

25. An image forming system as claimed in claim 24, wherein said second processing means make the image data of a plurality of pixels from the image data of one pixel, so as to execute the image data magnifying processing.

26. An image forming system as claimed in claim 19, wherein said printing section uses an ink jet head having an ink ejection opening for ejecting an ink and performs printing by ejecting the ink from the ink jet head.

27. An image forming system as claimed in claim 26, wherein an image forming system as claimed in claim 15, wherein the ink jet head has thermal energy generating means and produces a bubble in the ink by using thermal energy to eject the ink from the ink ejection opening.

28. An image forming system as claimed in claim 24, wherein said first magnifying rate and said second magnifying rate are determined further based on a resolution of image data.

29. An image forming apparatus for performing printing using an ink jet head by ejecting an ink onto a printing medium from said ink jet head, comprising:

processing means for executing magnifying processing, based on a second magnifying rate, for image data having been subjected to magnifying processing at a first magnifying rate executed by a host apparatus, said image data being fed from the host apparatus; and print control means for controlling a printing operation to be performed by driving the ink jet head based on the image data which have been subjected to magnifying processing executed by said processing means, wherein said first magnifying rate and said second magnifying rate are determined based on at least one of a resolution of printing, a processing load to be borne by the host apparatus and a capacity of an image data memory.

30. An image forming method comprising the steps of:

executing processing inclusive of magnifying processing with respect to each of plurality of kinds of image data based on a first magnifying rate;

synthesizing said plurality of kinds of image data each of which is magnified by said step for executing processing, based on a synthesizing information;

executing magnifying processing for the image data synthesized by said step for synthesizing, based on a second magnifying rate; and executing a printing operation based on the image data which have been subjected to magnifying processing executed by said step for executing magnifying processing.

31. An image forming method as claimed in claim 30, wherein said step for executing processing executes processing by software, and said step for executing magnifying processing executes magnifying processing by hardware.

32. An image forming method as claimed in claim 31, wherein said step for executing magnifying processing executes magnifying processing for the image data to form the image data for repeated printing operations.

33. An image forming method as claimed in claim 30, wherein said first magnifying rate and said second magnifying rate are determined based on a capacity of an image data memory for storing image data for printing, resolutions of the plurality of kinds of image data and a resolution of printing performed by said printing section.

34. An image forming method as claimed in claim 30, wherein said step for executing the printing operation executes the printing by ejecting an ink to a printing medium.

* * * * *

UNITED STATES PATENT AND TRADEMARK OFFICE
CERTIFICATE OF CORRECTION

PATENT NO. : 5,754,304
DATED : May 19, 1998
INVENTOR(S) : HIROSHI ENDO, ET AL.

It is certified that error appears in the above-identified patent and that said Letters Patent is hereby corrected as shown below:

AT [57] ABSTRACT

Line 1, "an" should read --a--; and
    Line 14, "An" should read --A--.

COLUMN 1

Line 19, "will" should read --well--.

COLUMN 3

Line 57, "executed)" should read --executed).--.

COLUMN 6

Line 40, "is" should read --is a--; and
    Line 49, "is" should read --is a--.

COLUMN 7

Line 56, "if" should read --1f--; and
    Line 58, "if" should read --1f--.

COLUMN 8

Line 46, "in" should read --of--.

COLUMN 9

Line 45, "kind" should read --kinds--.

UNITED STATES PATENT AND TRADEMARK OFFICE
CERTIFICATE OF CORRECTION

PATENT NO. : 5,754,304

DATED : May 19, 1998

INVENTOR(S) : HIROSHI ENDO, ET AL.

It is certified that error appears in the above-identified patent and that said Letters Patent is hereby corrected as shown below:

COLUMN 10

Line 11, "in" should be deleted;
    Line 12, "the" should be deleted; and
    Line 21, "ones" should read --one--.

COLUMN 12

Line 7, "upperstaged" should read --upper-staged--; and
    Line 32, "upperstaged" should read --upper-staged--.

COLUMN 13

Line 2, "kind" should read --kinds--.

COLUMN 14

Line 20, "be also" should read --also be--.

COLUMN 19

Line 55, "be also" should read --also be--; and
    Line 58, "consists" should read --consist--.

COLUMN 20

Line 14, "be also" should read --also be--.

UNITED STATES PATENT AND TRADEMARK OFFICE
CERTIFICATE OF CORRECTION

PATENT NO. : 5,754,304

DATED : May 19, 1998

INVENTOR(S) : HIROSHI ENDO, ET AL.

It is certified that error appears in the above-identified patent and that said Letters Patent is hereby corrected as shown below:

COLUMN 23

Line 24, "claim 14," should read --claim 19,--;
    Line 28, "claim 14," should read --claim 19,--;
    Line 51, "execute" should read --execute a--; and
    Line 62, "claim 19," should read --claim 24,--.

COLUMN 24

Line 4, "wherein an image forming system as claimed in claim 15," should be deleted; and
    Line 32, "plurality" should read --a plurality--.

Signed and Sealed this

Fourth Day of May, 1999

Attest:

Attesting Officer

Q. TODD DICKINSON

Acting Commissioner of Patents and Trademarks